(12) United States Patent
Odom

(10) Patent No.: US 7,330,997 B1
(45) Date of Patent: Feb. 12, 2008

(54) SELECTIVE RECIPROCAL BACKUP

(76) Inventor: Gary Odom, 15505 SW. Bulrush La., Tigard, OR (US) 97223

( * ) Notice: Subject to any disclaimer, the term of this patent is extended or adjusted under 35 U.S.C. 154(b) by 486 days.

(21) Appl. No.: 10/859,738

(22) Filed: Jun. 3, 2004

(51) Int. Cl.
*G06F 11/00* (2006.01)

(52) U.S. Cl. .......................................... 714/6; 711/162

(58) Field of Classification Search ................ 707/204; 714/6, 20; 711/162
See application file for complete search history.

(56) References Cited

U.S. PATENT DOCUMENTS

| | | | |
|---|---|---|---|
| 5,367,698 A | 11/1994 | Webber | |
| 5,537,585 A | 7/1996 | Blickenstaff | |
| 5,778,395 A | 7/1998 | Whiting | |
| 6,704,849 B2 | 3/2004 | Steegmans | |
| 6,714,968 B1 | 3/2004 | Prust | |
| 6,728,751 B1* | 4/2004 | Cato et al. | 709/202 |
| 7,085,835 B2* | 8/2006 | Bantz et al. | 709/226 |
| 2003/0204609 A1* | 10/2003 | Anderson et al. | 709/229 |
| 2004/0153481 A1* | 8/2004 | Talluri | 707/200 |
| 2004/0153884 A1* | 8/2004 | Fields et al. | 714/52 |
| 2004/0236803 A1* | 11/2004 | Spiegeleer | 707/204 |
| 2005/0235122 A1* | 10/2005 | Pillai et al. | 711/162 |
| 2005/0257085 A1* | 11/2005 | Haustein et al. | 714/13 |
| 2005/0278299 A1* | 12/2005 | Yamada et al. | 707/1 |

* cited by examiner

*Primary Examiner*—Marc Duncan

(57) ABSTRACT

The disclosed technology applies the principle of anonymous reciprocity to facilitate remote backups. A local computer stores other computer's backup files, while storing backup copies of local files on other computers connected through a network. Each computer may securely maintain and manage storage for other computers' files. Application may be constrained to a local area network, or work on the Internet. The disclosed technology works in a peer-to-peer environment; no central server is required. The same disclosed technology may also apply to file sharing.

18 Claims, 10 Drawing Sheets

SELECTIVE RECIPROCAL BACKUP

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The relevant technical field is computer software, specifically backing up local files on remote computers.

2. Description of the Related Art Including Information Disclosed Under 37 CFR 1.97 and 1.98

At the time of writing, in the United States of America, local area networks (LAN) are ubiquitous in office environments, and the norm in homes with more than one computer, thanks to operating system software that renders network configuration painless. Always-on broadband wide-area network (WAN) connections, such as to the Internet, are increasingly common. As of early 2004, an estimated 76% of American households had some form of Internet connection, with an estimated 40% having a broadband connection.

Computer processors are now so powerful that CPU usage is normally a fraction of potential for the typical personal computer or office workstation.

Computers are increasingly the knowledge repository of human endeavor. The value of a computer document is most obvious to its owner when lost. Backups are the only solution.

There are many ways to back up files known in the prior art, including hardware support, such as RAID 1 disk mirroring, software programs such as Second Copy 2000 by Centered Systems, which allows user-configurable local or LAN backup, and Internet backup services, which facilitate backup to a commercial server through the Internet.

U.S. Pat. No. 5,778,395 (Whiting) disclosed remote backup to a common storage area, minimizing disk space by using incremental backups.

U.S. Pat. No. 6,714,968 (Prust) succinctly described an Internet backup technology that uses storage servers with individuals being accorded virtual storage areas via password-protected accounts, facilitating "seamless" access. U.S. Pat. No. 6,714,968 followed upon the same remote virtual storage concepts expressed in U.S. Pat. No. 5,771,354 (Crawford).

U.S. Pat. No. 6,704,849 (Steegmans) disclosed remote backups with serious security considerations, including encryption and redundancy, using data streaming.

U.S. Pat. No. 5,367,698 (Webber) grappled with migration and archive of unused files at a time where storage space was at a premium. Similarly, U.S. Pat. No. 5,537,585 (Blickenstaff) provided insights into archival file migration techniques.

U.S. Pat. No. 6,675,205 (Meadway) disclosed techniques for peer-to-peer file transfer, accounting for circumstances when a computer may be offline.

U.S. Pat. No. 6,728,751 (Cato) disclosed an automated network backup system. Involuntary local storage reservation for backup of files located on remote computers was under the aegis of a command backup (CB) server agent. As disclosed, "backup of data on individual machines is taken out of the control of the individual users of the machines, who essentially have no choice in the matter." Backup was disclosed as occurring during idle time.

Various types of modification/partial backup strategies are known. One regime, the classic incremental backup, requires a full backup of all files periodically, and in between full backups, backing up only the files that have changed since the last full backup in between. Another concept is known as differential backup, in which each partial backup contains all changes since the last full backup, instead of just changes from the previous incremental backup. Differential backup requires only two backups (one full and one partial) to restore files as of the time of a particular backup. Such backup techniques reduce overall the time required for a backup, and, in the case of network backup, decrease network bandwidth requirements.

Existing backup tools incur a cost, such as paying a monthly fee for an Internet backup service, or require configuration, such as Second Copy 2000, and do not offer the security of remote backup.

Most personal computer users have considerable unused hard drive storage capacity. At the time of writing, the most inexpensive desktop computers come with 40-80 gigabyte (GB) hard drives or more. A full install of the Linux operating system takes less than 5 GB; Windows XP takes 10 GB. That leaves a typical home or office computer with at least 35-75 GB of free storage after OS installation. A typical user, even after years of usage with thousands of files, may stretch to take 10 GB in file storage, yielding 25-65 GB of free storage, and that is just for the least expensive computer. At the time of writing, a 120 GB hard drive costs less than $100. Mass storage is inexpensive, and getting cheaper.

An individual hard disk, computer, or even the space in which the computer exists, may suffer sudden tragic demise. The only insurance for such local tragedy is off-site or remote backup. The problem is how to facilitate remote backup conveniently and inexpensively while retaining data security.

BRIEF SUMMARY OF THE INVENTION

What every typical computer has is a surfeit of drive storage. What local computer storage cannot do is provide off-site remote backup.

The proposed solution is to trade a portion of available local storage for remote storage in which a backup may be made. The disclosed technology solves the problem of off-site storage while successfully tackling the issues of data security, assuredness of backup restoration availability when needed, user convenience via simple setup, smoothness of operation so as not to disrupt optimal computer performance during user operation, and overall cost minimization to all participating parties. The disclosed technology works in a peer-to-peer environment, requiring no central server or storage.

Anonymous reciprocity is the fundamental operating principle of the disclosed technology. A local computer user selects the desired data to be backed up remotely. In selecting data for backup locally, storage is allocated locally accommodative to local backup requirements, but is not used to store or back up local data. The locally allocated space is used by others, located remotely, for their remote backups, and the analogous allocated storage on remote computers is used to backup the local data. In essence, a user selects files to be backed up, without an indication of where the files are copied to. Backend software handles backup to remote storage without requiring user guidance. Preferably, backed-up data is encrypted to ensure integrity, and compressed to minimize storage requirements. This system provides a pool of off-site backup storage for all participants, not requiring user specification other than what is to be backed up, without need for central administration or server storage that would raise the cost of the endeavor.

A remote backup is insurance. The insurance becomes illusory if the backup cannot be accessed when restoration is required. To minimize risk relating to availability, redundancy may be employed, backing up to multiple remote computers. Further, the reliability and availability of computers storing backups may be gauged so as to increase the probability that a backup will be available if needed.

DETAILED DESCRIPTION OF THE INVENTION

Figure 1:
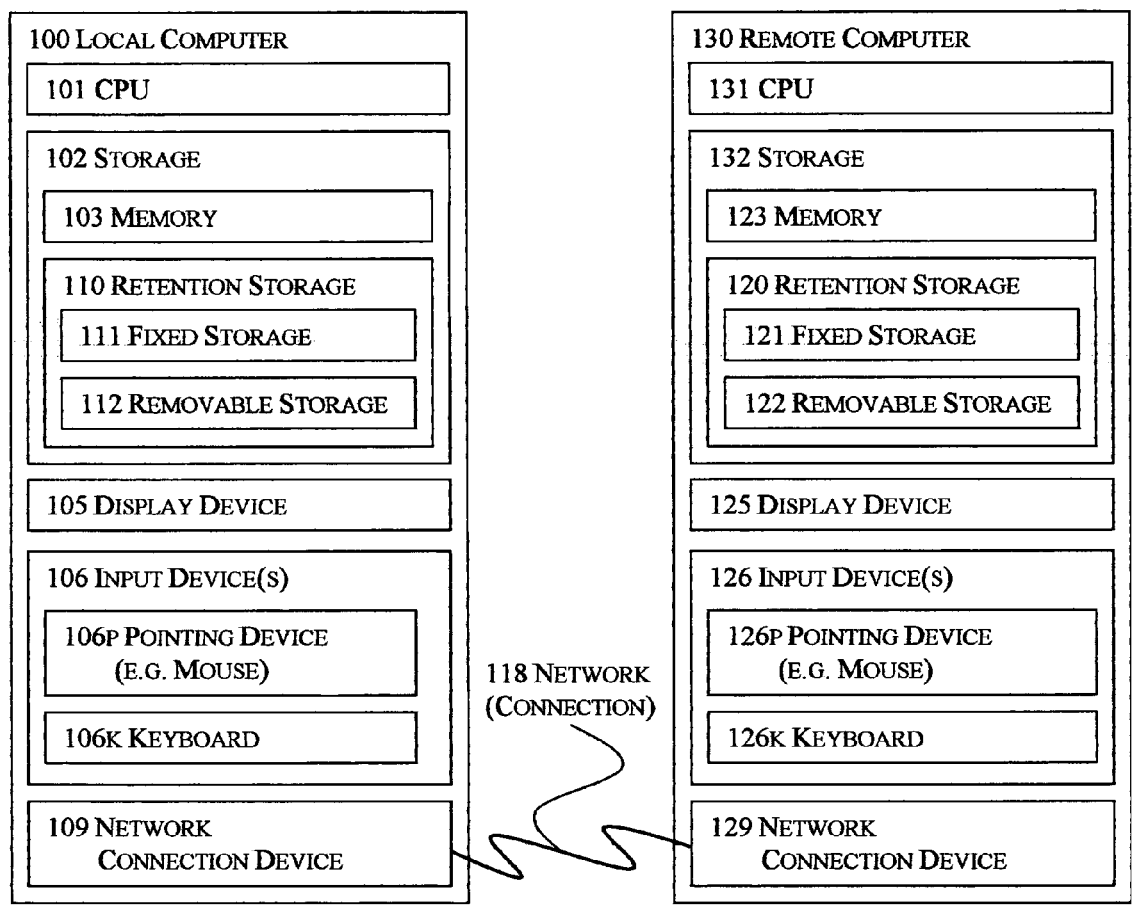
FIG. 1 is a block diagram of suitable computers.

FIG. 1 depicts a user computer 100 connected to a server computer 110 through a network 118. A computer 100 as a user workstation comprises at least a CPU 101; storage 102, which comprises memory 103 and one or more storage devices with retention media 110 of two varieties: fixed storage 111 such as hard disks, and removable storage 112, such as diskettes of various types, compact disks, or tape; a display device 105; and one or more input devices 106, examples of which include but are not exclusive to, a keyboard 106*k*, and/or one or more pointing devices 106*p*, such as a mouse. The mouse is the most popular pointing device 106*p* for desktop computers 100. In the description below, mention of a mouse is meant to include pointing devices 107 of any type. To allow access to a network 118, a computer 100 also has a device for connection to a network 109, such as an Ethernet adapter card or integrated circuitry.

A remote computer 130 may be equivalent to a local computer in configuration, as depicted in FIG. 1. Computers that are only used remotely, such through a network 188, and not directly by a user, may not have display 105 or input 106 devices. Servers sometimes lack user interface devices, as they may be managed from a remote workstation.

FIG. 1 is a block diagram of a client computer 100 connected to a server computer 110 through a network 118. A client computer 100, more simply called a client 100 or a computer 100, comprises at least a CPU 101; storage 102, which comprises memory 103 and optionally one or more devices with retention medium(s) 104 such as hard disks, diskettes, compact disks, or tape; an optional display device 105; and optionally one or more input devices 106, examples of which include but are not exclusive to, a keyboard 108, and/or one or more pointing devices 107, such as a mouse. The mouse is the most popular pointing device 107 for desktop computers 100. In the description below, mention of a mouse is meant to include pointing devices 107 of any type. As a client 100 in a network 118, a computer 100 also comprises a device for connection to a network 119. A server computer 110, more simply called a server 110, comprises at least a CPU 111; storage 112, which comprises memory 113 and optionally one or more devices with retention medium(s) 114 such as hard disks, diskettes, compact disks, or tape; and a device for connection to a network 119. A client-server environment is a setup whereupon one or more clients 100 are connected to one or more servers 110 through a network 118. A client 100 in a client-server environment primarily receives data. A server 110 primarily transmits data to be received by one or more clients 100. A peer-to-peer network is a setup whereupon one or more computers 100 are connected to one another with or without a server 110 on the network 118. A computer 100 in a peer-to-peer environment shares data with other computers 100 or servers 110. A network 118 may be any means by which one or more computers 100 are connected to one or more other computers 100 or one or more servers 110 for data transfer.

A network 118 may be any means by which one or more computers 100 are connected to one or more other computers or one or more servers for data transfer. Relative to a local computer, a computer is defined as remote if not physically within 5 meters or in the same room, even if on the same LAN. A computer is off-site if it resides in a different building, even if on the same LAN. The Internet comprises a worldwide network, and so a computer's location is defined as worldwide if off-site and on the Internet.

Computers commonly communicate through a network 118 sending data packets between virtual addresses, as is well known to those skilled in the art. The software disclosed herein relies extensively upon network communications and data transfers, a subject so well known that it hardly merits description herein, but mention of a few obligatory acronyms serves as a reminder of technology taken for granted nowadays. Internet Protocol (IP) addressing is ubiquitous. File Transfer Protocol (FTP) is a common networking protocol specifically for transporting files through a network from one computer to another. Transmission Control Protocol (TCP) is the common network communication protocol used to establish a virtual connection between computers. TCP/IP is by far the most common combined protocol for basic network communication. The history of computer networking is replete with the carcasses of innumerable computer communication protocols explored and discarded, because, not ironically, ultimately communications protocols are subject to "network effect", namely, that popularity snowballs in crowding out also-rans; hence TCP/IP presently dominates. In serving the purposes of the disclosed technology, however, any appropriate technique for network communication and data transfer, preferably secure, may be employed.

The disclosed technology may be a single application, packaged with other application services, be modularized software with an externally accessible interface, such as a plug-in for a web browser or other such technology, or integrated into an operating system file system. Depending upon embodiment, the technology may be implemented using various techniques, including, for example, a startup monitoring application, coupled with a user-accessible application with a web browser or file explorer user interface. A database backend is envisioned to maintain requisite data for backup selection and management. The disclosure explains various database fields, which may be represented as objects which class methods act upon, and the functional relationship between these fields/objects. Database and object-oriented programming, and particularly programming with object databases, are known to those skilled in the art, and are therefore not described in detail herein; knowledge of these programming areas is requisite to understanding this disclosure so as to translate the herein expressed design ideas to working executable code based upon requirements determined germane to intended application.

The backup software may have a small component running in the background while a computer starts. Such background tasks are known to those skilled in the art, and merit no further description here. One function of this background task may be to notify remote computers with backups 138 on the local computer 100 that the computer is accessible, or otherwise broadcast availability, once the background task is activated at computer startup.

Rule-based triggered actions using a relational database are well known to those skilled in the art, and may be employed to maintain data structures and trigger events relevant to performing the software operations disclosed herein. Software construction of conditional rule-making, in particular data-based rule triggering, is known to those skilled in the art. For more thorough description of rule-based event management within the context of database operations, suggested references include U.S. Pat. Nos. 5,446,885, 5,283,856, 5,615,359, 5,564,047, and 6,560,592. Backup indexes 222 and entries 235, backup index directory 221, backup options 300, locator index 186, and other data and rules required by the implemented embodiment and herein disclosed are in the preferred embodiment maintained in one or more database forms. One skilled in the art should be able to readily translate the features required into database schemas and rule-based event triggers interfaced to operational software.

Figure 2:
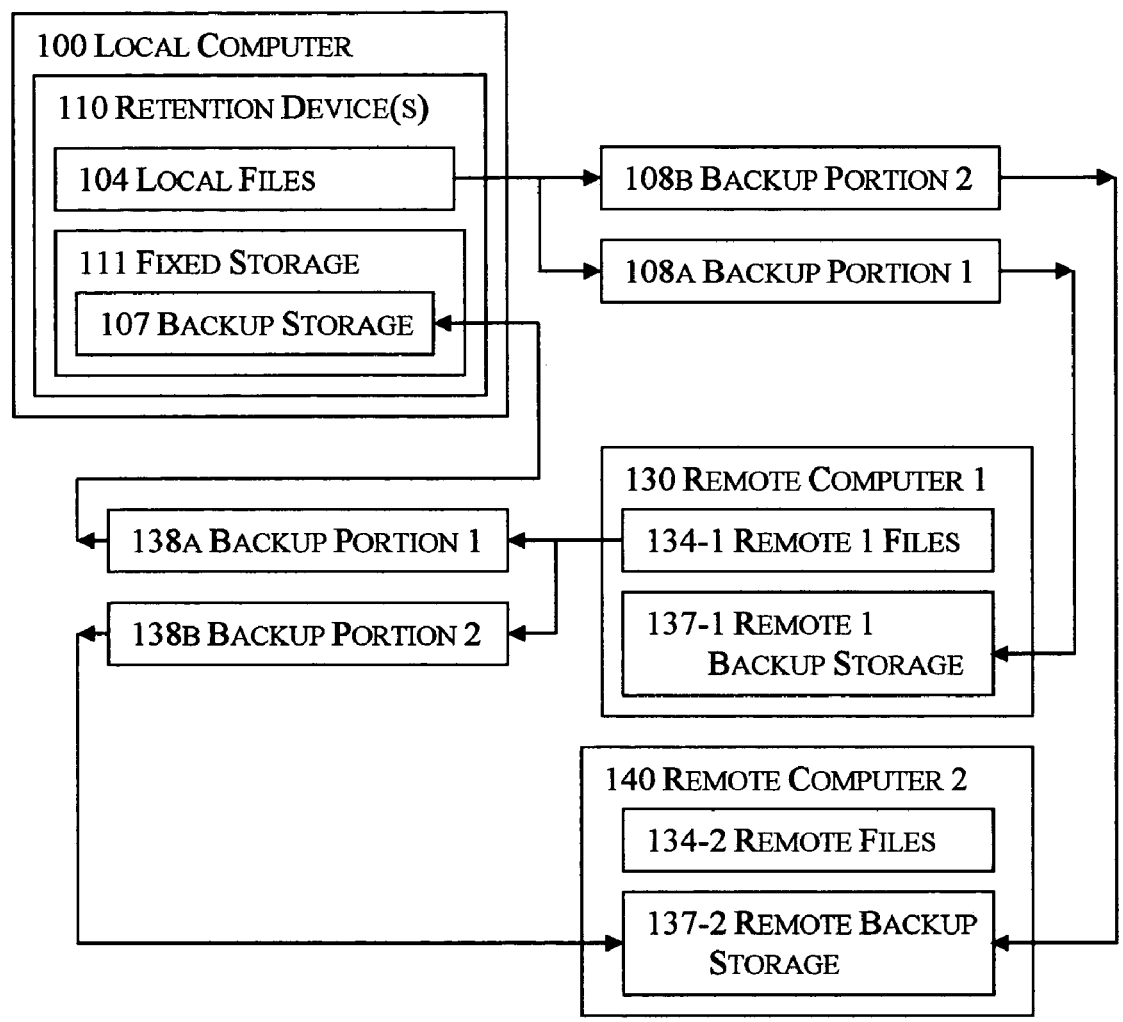
FIG. 2 depicts an exemplary network backup configuration.

FIG. 2 depicts a simple exemplary embodiment of a configuration of remote backups. Referring to FIG. 2, local files 104 to be backed up 37 are optionally partitioned 34 into multiple portions 108a, 108b. Individual files 203 themselves are not necessarily split, though that may be done for particularly large files. Files may be grouped together into a backup portion 108, for example, by file age: how recently the file has changed, and/or size, and/or another file attribute, such as file type. One or more factors may enter into the policy regarding portioning 309.

Figure 10:
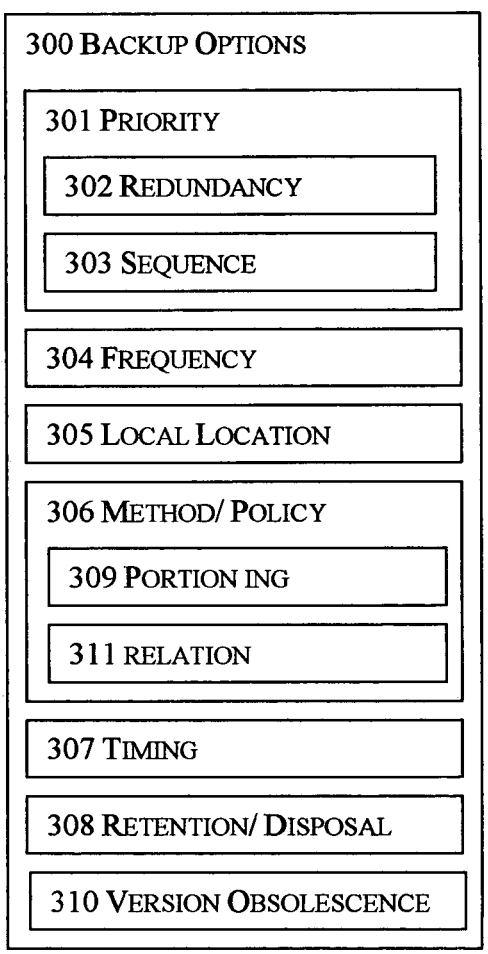
FIG. 10 depicts backup options.

Referring to FIG. 10, allowing user input into the portioning policy 309 may be part of the backup software. A user may be allowed to indicate which files 203 or directories 202 are of more or less value, for example; portioning 34 may then proceed along those lines.

Continuing with the example depicted in FIG. 2, each portion 108 may be backed up (transferred) 37 to remote storage 137 on different computers (137-1, 137-2), one portion 108a on one remote computer 130, another portion 108b on a different computer 140. Similarly, remote files 138 may be apportioned 34 and backed up on different computers. One reason for portioning 34 is risk minimization, to allow at least partial recovery in case a remote computer 130 is unavailable when a restore 41 is requested. If portions 108 are decided 309 upon value, for example, higher-value portions 108 may be accorded greater redundancy 302, or stored on remote computers with better availability 251 or reliability 250.

Backup method 306 may be based upon policies which may vary, including variations of modification (incremental and differential) backups. For example, incremental and differential backups may apply to individual files, thus backing up only changes to a file 104, as contrasted to changed files. U.S. Pat. No. 5,778,395 (Whiting), herein incorporated by reference, addresses such backup data reduction techniques for modification backups.

Figure 12:
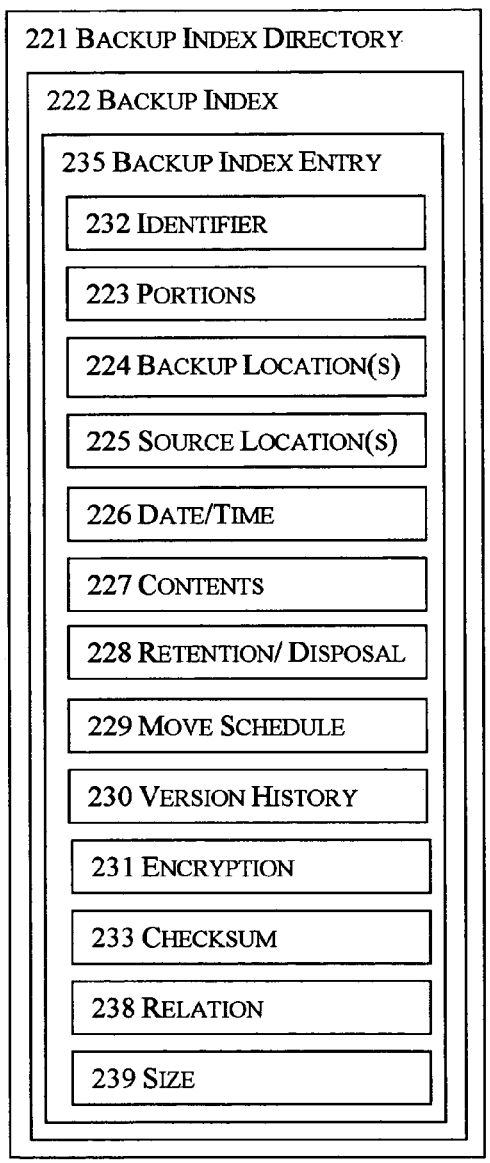
FIG. 12 depicts backup indexing.

The backup method 306 may be considered as part of a set of policies by which backups are managed. These policies may affect portioning 309 as well as how backups relate to each other 311. Backup relation 311 refers to backup structuring in relation to other backups, such as whether using incremental or differential backups. Backup relation 311 also refers to versioning of files through time, regardless of backup method (such as incremental or differential backup). In the index entry of a backup 235, as depicted in FIG. 12, a field may be maintained that states the relationship a backup has with any other related backups 238, particularly regarding file versioning.

Figure 7:
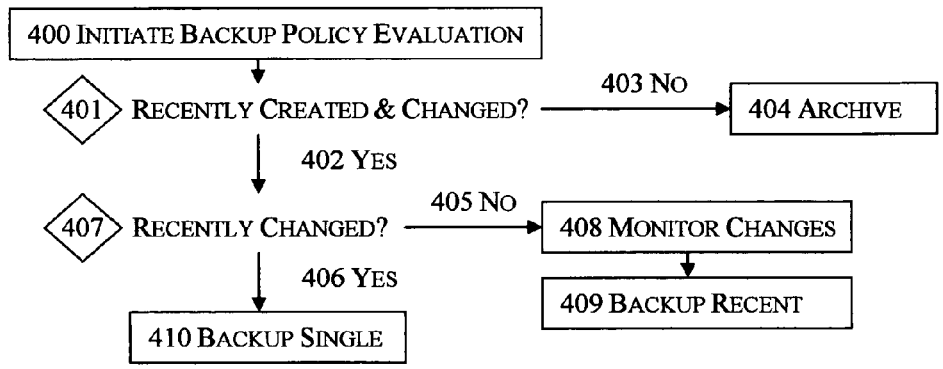
FIG. 7 depicts the backup policy formulation process.

FIG. 7 depicts an exemplary simple formulation of backup policy on a file-by-file or directory-by-directory basis. The concept expressed here is archiving older, not-recently-modified files, versus backing up actively used files. For example sake, "recent" refers to file changes within the past month. Old files or directories 403 may be archived 404 together in a single backup or in portions 108. For example, a "small" set of files may be put into a single backup; a larger set split into portions 108. The definition of "small" may be relative to network bandwidth 253: "small" for a dial-up connection may be 500 KB, but 2 MB or more for a broadband connection. Portioning 108 may be decided based upon how recently files within an archive have been modified. Files 203 that have not recently changed may be backed up together 409, possibly in portions 108, and local changes to the source files monitored 408.

Continuing with the FIG. 7 example, if a file within a backup 108 is changed and thus rendering the backed-up version obsolete (note that changing a file does not necessarily render a previous backed-up version obsolete), the backup's value may drop (though an earlier backup may serve as an archive within a versioning policy). To save space, assuming the file size is above a threshold justifying the effort, it may be advisable to extract a file from a backup 108, then recompress the backup; put another way, recompress the backup 108 without the obsolete file. If using a policy 306 based upon versioning, described below, an older version may serve as a base for incremental or differential backups; the relation field 238 in the backup index entry 235 should hold this information.

The packaging of portions 108 of data intended for backup may vary as a matter of policy 306. Under one policy

306, all files to be backed up may be bundled into a single file 138, then the file split into identifiable portions. Under another policy 306, files are grouped into portions 108 according to priority 301 and/or how recently modified. Policies may vary for different backups.

One embodiment allows an entire backup comprising multiple files on a single remote computer 130. One embodiment makes backups on a file-by-file basis. One embodiment makes backups file-by-file, accounting for versioning, thus including in a backup by appending modification (differential or incremental) backups; when a new base (full) file backup is made, it is distinct from the previous backup. These embodiments may be practical in certain situations, such as single-file backups, small backups, incremental backups, frequent backups, backups to computers with high network bandwidth 253, or backups with greater redundancy 302. An algorithm may be developed with thresholds for each factor. For example, backups may have 1 GB portions 309, such that smaller than 1 GB is backed up to a single machine if a backup is made at least within three days of any backup files changing, and there are at least three backup copies made, otherwise all backups greater than 500 MB are apportioned. Network bandwidth 253 in particular may influence portioning 309, in that lower bandwidth, such as a dial-up connection, may suggest low portion size, so as to back up files without unduly slowing network connectivity and computer usability (the user experiencing sluggish response).

In one embodiment, files are backed up individually, or grouped based upon modification date, taking into account priority, if priority is established, and possibly file size. For example, for a backup regime happening each two days (where changes in files have occurred within the past two days), only those files that have changed since the last backup are backed up. In this embodiment, the aging process 25 may be fragmented, applying selectively to progressive versions of files.

Files 104 that have recently changed 406 may be backed individually 410. The definition of "recent" is a usage issue, and may vary from days to weeks, depending upon specific computer usage. Software may initially set "recent" as one week, for example, and modify the setting based upon computer usage. One exemplary backup method 306 is to treat each file 104 individually, and after a file is modified, a backup is created 3, or the file's backup 108 is appended with recent (incremental) changes. So, for example, a backup 108 may be made of one or more related files, where the initial, base files serve as a full backup, and incremental changes are appended to the backup 108. Using the indexing 222 technology disclosed, an index entry 235 may be modified to reflect an incremental change in a backup portion 108. So, for example, new backup portions 108 may be appended to an index entry 235 to reflect new versions of a base file actively being worked on. Alternately, a backup file 108 may have, in essence, a new portion 108 appended to it, with its index entry 235 updated with a backup location 224 that is an offset into the backup file 108. An additional source location 225 may be added to the index entry 235 for each new source version.

A threshold percentage of bytes changed or other such indicator may be used to determine whether the backup generated after the file modification should be a full backup or a modification backup. Using a threshold rule, for example, a modification (incremental or differential) backup may be made if less than 30% of total bytes change, or a full backup may be made after a set or rule-based number of backups, or a number of backups accumulating to a threshold percent change, or accounting for maximum number of changes or percent of change: for example, a full backup after five changes or a cumulative 30% in changes, or a single modification greater than 15%. The threshold rule may be asymmetric, in that applying the rule to generate a full backup only to files where content is added; a large deletion of content, for example, might easily be accounted for in an modification backup, thus avoiding another full backup.

Incrementally backing up file changes may be made by dissecting the changes. For text and word processing documents, for example, this process is tracking the changes in text and formatting by noting file beginning offset or some other means, and as well insertion or deletion of enclosed media. In one embodiment, file comparison, using in part a Unix-like 'diff' function known to those skilled in the art, allows incremental backup of file changes for those file types where incremental change may be readily established. A similar approach may be made for object-oriented files. Files not as easy to dissect for content may also backed up in increments by registering the byte-wise changes at byte offsets in the file. Such modification file backup techniques are known to those skilled in the art, and any variation may be employed with the disclosed technology.

If incremental changes cannot be established, the entire file may need to be backed up, but the history of the file 230 may be retained in the backup index 222. In this embodiment, the root or base file upon which incremental backups are based should have a high reliability of recovery, perhaps by redundancy 302 and backup on reliable 250 computers, otherwise the incremental backup scheme is based upon a shaky foundation.

As depicted in FIG. 7, monitoring backup selection and the dynamic changes of files over time may provide input into a rule-based system used to develop an optimal policy 306 for backups to maximize reliability while minimizing network bandwidth and storage requirements. Tracking file changes 408 may be integrated within the operating system file system, or mirror operating system file system management using a database. In one embodiment, the user of the backup software may see and edit the backup policy rules 306. Document versioning provides an example.

Documents are commonly updated over time, which results in a sequence of revisions. Each document version is represented in the file system as a separate file. Some documents are short-lived, while others have a long revision history. It may be desirable for the backup software system to be able to reproduce specific older revisions of a document as well as more recent revisions. Some documents may have multiple concurrent versions. For example, an application software manual might have several different versions, one document for each operating system on which the application runs. These different but related, parallel versions have their own independent revision histories. The backup software may be integrated with a sophisticated document versioning system and attendant file service, such as that disclosed in U.S. Pat. No. 5,220,657 (Bly), for example, with the backup software database as disclosed integrated within the document versioning software database, the backup software handling backups for each document file. In a simpler case, a user may create a directory (within a hierarchical directory structure) to hold the document files for each major version. A user may practice a rudimentary version of such document versioning, which may be used advantageously in backup strategy 306. For example, a user may create a new file: "document 01", filling it with some initial content, then, at some point in the entry/editing process, save the file as "document 02" and so on. All versions of the document may be saved in a directory, perhaps with earlier versions in an "archive" subdirectory. If the directory that the documents are in is selected for backup, the backup software may look at the documents within, comparing file names (including extension, which commonly indicates file type, thus verifying versions of the same document type), check file creation and modification dates, and possibly content changes, and thereby discern versioning history. The latest saved (most recent) document in the set is likely the most valuable. In one embodiment considering this example, when making a backup 3, the backup software can take all versions, make a backup 3, then incrementally back up new versions of the document, treating the previously backed up versions as an archive that may not be backed up again, and be treated with accelerated aging for movement and disposal. So, for example, the first version is initially created and backed up. Say that normally backups are disposed after one year, based upon user preference for disposal age 308. Knowing that newer versions exist, rendering the older versions less valuable, backups of the earlier versions may be deleted after six months. In one embodiment, the backup software may offer the option of setting accelerated aging for versioned files, and/or reduce redundancy 302 for versioned files. In one embodiment, a user may set retention, aging, and disposal policies.

As backups occur periodically, in one embodiment each backup 108 may be on a different computer. This may apply to single-computer or multiple-computer backups.

Figure 3:
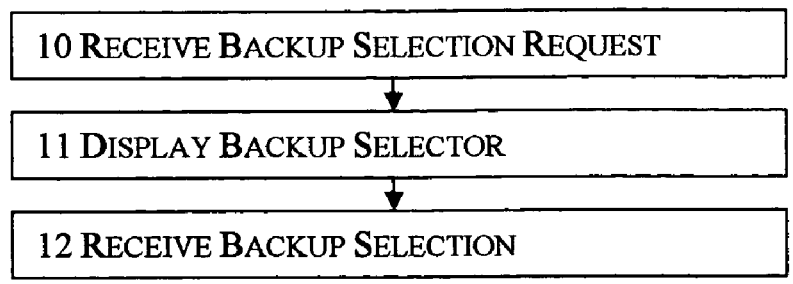
FIG. 3 depicts the backup selection process.

FIG. 3 depicts the backup selection process in an embodiment where a user at least in part selects the files to be backed up. Backup software receives a backup initiation request from a user 10. The backup software displays a means 11 allowing a user to select the directories and/or files to be backed up, and receiving user selection 12 for subsequent processing.

Figure 4A:
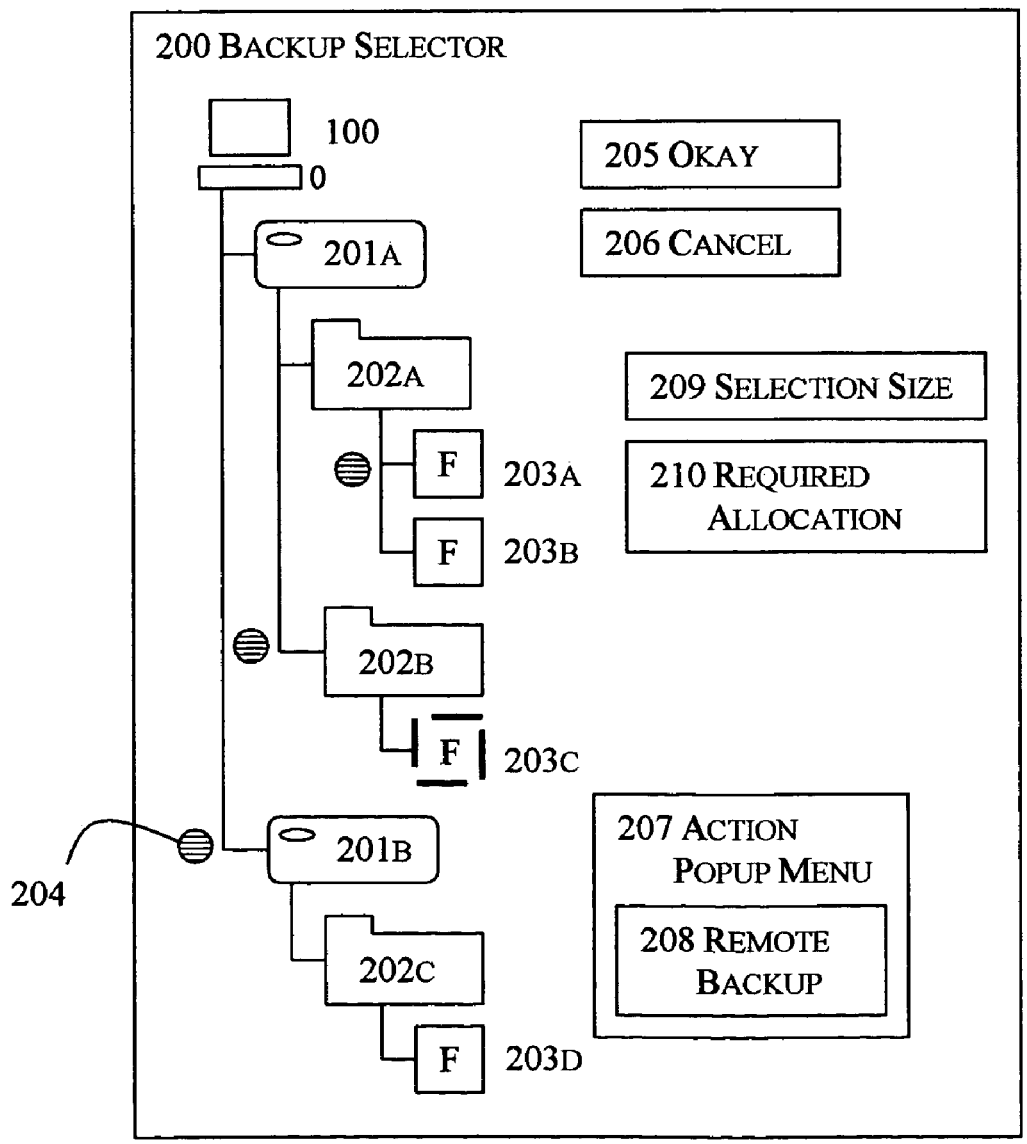
FIG. 4*a* depicts backup selection.

FIG. 4*a* depicts an exemplary embodiment of a backup selector 200. The method of receiving user selection of items for backup 12 may vary by embodiment. In one embodiment, the backup selector 200 may be a user interface adjunct to the backup software, such as a dialog, as depicted in FIG. 4*a*. In one embodiment, the remote backup selector may be integrated into a file viewer, such as Windows Explorer® for the Microsoft Windows® operating system. As the help text in Windows XP® Home Edition® explains: "Windows® Explorer displays the hierarchical structure of files, folders, and drives on your computer. It also shows any network drives that have been mapped to drive letters on your computer. Using Windows Explorer, you can copy, move, rename, and search for files and folders. For example, you can open a folder that contains a file you want to copy or move, and then drag the file to another folder or another drive." (© Microsoft Corporation) Incorporating backup selection 200 seems a natural functional extension.

As depicted in FIG. 4*a*, using the backup selector 200, a user may select items including files 203, folders 202, and/or drives 201 for remote backup. In an exemplary embodiment, conformant with Windows Explorer operation, selecting a drive 201, folder 202 or file 203 using a particular button on pointing device 107 causes display of an action popup menu 207. In the example depicted in FIG. 4*a*, a file is selected 203*c*. The action popup menu displays actions relevant to the selected item. One action option may be to select the item for remote backup 208. As the file system is hierarchical, selecting a higher level item selects all lower-level items within. For example, selecting a folder 202 results in selection of all files 203 within the selected folder 202. Selected items may be indicated 204 during the backup selection process. Alternately, the backup indication 204 may be permanent, that is, by default shown when the item has been selected for remote backup. In Windows® Explorer, for example, shared items are iconically indicated. Likewise, an item designated for remote backup may have its own iconic representation.

During backup selection, an indication may be shown of the storage required for the selected items 209. Similarly, the required allocation of local storage 210 given the selected size 209 may be displayed interactively. To maintain fairness in reciprocity, a user may be warned, and further selection disallowed, if backup selection size 209 exceeds free space locally for backup storage 210 based on the enforced local storage allocation requirement algorithm. In one embodiment, the check for sufficient free local storage is done interactively while a user is making backup selection. In alternate embodiments, the user may not be warned until after selection, or not warned at all. In one embodiment, tolerance may be allowed in local storage allocation, figuring that some users may have surplus, some may be strapped for space, and allocation requirements met with a prevailing communistic attitude. In one embodiment, redundancy 302 my be lessened to accommodate a larger backup size 209.

In an alternate embodiment, user backup selection may not be used for any or all backups 108. In an embodiment where the backup software is integrated into the operating system, certain system files may be backed up automatically, for example. Similarly, data files created or modified by specific applications may be subject to automatic backup. In one embodiment, files may be backed up unless a user specifies otherwise.

Referring to FIG. 10, backup configuration may have options 300. Default options 300 may be set, and subject to adjustment by a user; for example, a user may select an "Options" menu item that brings up a dialog that allows setting options for all or selected backup items. The backup software sets options 14 within acceptable parameters. In the preferred embodiment, a user may only adjust option settings within parameters acceptable given the operating environment. For example, with 30 GB of storage available, and a user selection of 8 GB for backup, setting redundancy level to five, would exceed storage allocation parameters, and so a redundancy 302 of three would be the limit in this example.

Backup options 300 may be presented for user selection in a variety of ways. One embodiment is as a popup dialog when a backup item selection is made 2. A priority option 301 allows a user to indicate a level of priority associated with one or more items. Priority 301 may relate to the sequence 303 and/or frequency in which item backup occurs. As a user setting, sequence 303 is an advanced option, where a user may select the order in which files 104 are backed up. Allowing sequence setting may be desirable to help ensure that the highest priority items are always backed up. Priority 301 may also relate to redundancy level 302, that is, the number of backup copies to be maintained, either of selected or all items. The frequency of backups 304 may apply to individual items and as well to the entire backup process. In other words, a user may given the option of backing up certain items more frequently than others, with a baseline frequency of backup applied to all selected items 12.

One embodiment allows a user to set a priority 301 of 'high', 'medium', or 'low', whereupon the software sets redundancy 302 and sequence 303 algorithmically. For example, files set to 'high' priority are backed up before other priority levels (first in sequence 303), and with a redundancy 302 of 3 copies on the most reliable 250 computers. 'Medium' priority files are backed up after high-priority files, with 2 backup copies on computers averaging mean reliability 250 (perhaps one high-reliability copy, one lower-reliability copy). Files with a 'low' priority are backed up last, and only one backup copy made.

A version obsolescence option 310 may exist to accelerate disposal of or retain (as an archive) obsolete documents. For example, a file with the same name may change contents. That may obsolete the previous version of the file, thus rendering the backup of the previous file obsolete. In an exemplary embodiment where individual files are backed up, the backups of the modified files may be deleted. Alternately, in one embodiment, a backup level related to version obsolescence 310 could be set, specifying how may generations of document versions to retain in backup. Second Copy has an analogous feature, where a user may specify how many copies of changed files to keep. Using this strategy, if one backup version were set as being retained, second and older generations would be deleted. A modification backup regime may be used with version obsolescence 310 employing backup consolidation. Depending on embodiment, a local or remote computer could perform backup consolidation (a form of restoration, then consolidation of partial backups into a complete backup, followed by reincorporation into backup form). If more than one archive version is maintained, with incremental or differential backup from a base (full) backup employed, a rule may use the size difference in backups to determine when to establish a new full (base) backup. So, for example, a 10 MB file is changed by 1 MB, then incrementally another 2 MB the next version, successively 1 MB, 1 MB, 1 MB; the cumulative changes representing differentials are 1 MB, 3 MB, 4 MB, 5 MB, 6 MB. One such rule may be once cumulative changes are half or more the size of the full backup, a new base backup is created. In the example, after the fourth backup, where the 5 MB change occurs, a new full backup may be made.

To ensure off-site storage, a user may be asked to identify the physical location 305 of the local computer 100. The specificity of physical location 305 may vary depending upon embodiment and application. For example, for use in a corporate LAN, where office computers are backed up through a corporate campus, building number and/or office location within building may suffice. For worldwide backup in an exemplary embodiment, city may be the smallest geographic indication. In some applications and embodiments, local location 305 may be automatically discerned through the IP address. For example, for application in a corporate WAN environment limited to a specific set of LANs, where each LAN is known to be geographically distinct, backup locations 224 may be determined using the sub-network address as suitable for remote or off-site storage. The backup software may be configured to ascertain or request from the user appropriate local location 305 depending on specified application.

A rule-based locality indicator system with a user interface may be available for administrator configuration. For example, the corporate LAN administrator responsible for configuration and distributing the backup software may set a rule base establishing localities. Different buildings may have different letters, for example. Similarly, different campuses may have different indicators. So, for example, CIA-203 may indicate office location 203 in building A on campus one. The administrator may set the locality rules that the first digits after C indicate campus, the succeeding letter indicates building, and the last digits indicate office location.

Figure 6:
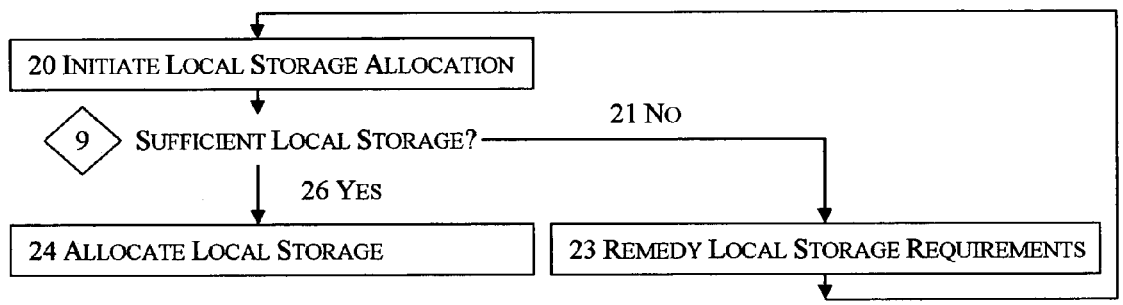
FIG. 6 depicts the local storage allocation process.

Referring to FIG. 6, in one embodiment, local backup storage is allocated 24 based upon the size of selected backup items 209. In one embodiment, local backup storage 107 is based upon, and limited to, free fixed storage 111, and perhaps taking into account reliability 250. Various algorithms may be used to determine the size of local backup storage 107.

While local computer storage 102 is used to prepare a backup file, the local backup storage 107 is storage reserved for backing up remote files by others, not for local use. Local backup storage 107 is the embodiment of the reciprocity principle upon which this technology is based. In essence, a user selects files to be backed up, without an indication of where the files are copied to. Separate software, a locator service 185, determines backup localities after user backup selection is received 12. In the preferred embodiment for backup software, a user only selects the files 104 to be backed up, and has no involvement in selecting backup locality.

Referring to FIG. 6, in the preferred embodiment, initiate local backup storage allocation 20 after receiving backup selection 12. Determine whether there is sufficient local storage 4 based upon backup selection size 209, or whatever criteria or algorithm is being applied. In a simple exemplary embodiment, if available (free) local fixed storage 111 is three times the backup selection 209, leaving 20 percent available for other uses, sufficient storage exists 26.

Local backup storage (for others) 107 may be limited to fixed disk drives 111. Removable storage 112 may be disallowed for backup storage 107 because of the risk of unavailability to remote users, but may be used if available for creating a local backup file 3. In the preferred embodiment, however, a user may select items on a removable disk for backup. If the items are not available for backup at the time backup occurs, they simply are not backed up. In such an instance, the user may be informed of the situation using an error log or user interface alert.

The following factors may be used for estimating local backup storage 107 allocation 210: 1) selected backup size 209; 2) backup compression ratio; 3) growth in backup requirements over time; 4) redundancy preference 302; 5) disposal age preference 308. An example is provided herein to facilitate understanding; this example is not intended as limiting or definitive, but simply exemplary. The selected backup size 209 is the primary basis for estimating local backup storage 107 allocation 210. For example, 10 gigabytes of storage is selected for backup 209.

A quick survey of the file types may be taken at the time backup selection is made 12, or thereafter, to yield and compression ratio estimation. An overall compression ratio may be assumed, perhaps 20%. In a more sophisticated embodiment, compression is considered taking into the actual files selected. Different types of files offer different compression opportunities. For example, text and word processing documents tend to be highly compressible, around 50% or more, as do uncompressed graphics and audio images. It is common nowadays, however, to use file formats for graphics, video and audio files that are already compressed, allowing at most a further 10% or so further compression possibility. Adobe Acrobat files, a common file format for portable documents, also allow at most a further 10% compression. In the preferred embodiment, a count of selected files 209 by file type yields a sufficient estimation basis for compression ratio. Basically, take the sum of the plurality of files by type, using the summation size of files for each file type times an average compression ratio to get each files-by-type size estimate. Continuing the 10 GB example, figuring a 15% compression ratio gives 8.5 GB.

Continuing the example, compressed backup selection 209 becomes the baseline for further calculation. In one embodiment, growth in backup requirements over time is anticipated; 10% may be assumed, for example. Continuing the example, 8.5 GB time an additional 10% yields 9.35 GB. And that brings up a simplification issue. In one embodiment, the factors of compression and backup growth may be considered to wash each other out; in other words, simply take the selection size 209 as the baseline. A more sophisticated embodiment may consider that such simple rules work in a limited set of cases, and the extra calculation is merited in other cases, particularly where selected files 209 may be subject to much or little compression 33.

As backup may be redundant, in one embodiment at user discretion, allocate local storage 24 as a multiple of the selected storage size 209 times redundancy 302. Continuing the example, if 10 GB of storage is selected for backup 209, with a minimum redundancy of three copies, local storage allocation would equal 30 GB. More or less redundancy would of course affect local storage allocation requirements 210.

Referring to FIG. 10, in one embodiment, a user may be given a say in setting a retention policy 308, which equates to disposal age. The user-set preference for backup disposal 308 may be contingent upon other factors, particularly available storage 102, local backup storage 107, and redundancy 302.

Continuing the example, of 10 GB selected, three redundant copies each, disposal 86 after five backups exist, yields a 150 GB total backup storage 107 requirement. A rule-based algorithm my be used that the estimated size of a local computer's 100 total backups 108 may not be allowed to exceed local backup storage for others 107. Given an roughly estimated average current size of 120 GB storage in consumer personal computers, 150 GB in backup requirement is too much; an adjustment must be made. For one thing, 10 GB is a bloated backup size 209 for an average user; 2 GB of essential data is more likely. Regardless, continuing the 10 GB example, adjusting redundancy 302 to two, disposal 308 to three, and 60 GB is required; more like it. This example perhaps provides insight into the local storage allocation estimation process, and that a rule-based algorithm is well advised.

A suggested embodiment for the backup software application is allowing a user a choice of simple or advanced setup; that is, setting redundancy 302 and disposal 228 in software without user intervention or option based on available storage 111 in simple mode, but allowing user selection in advanced mode. For example, in one embodiment, move schedule 229 is set in software, not subject to user choice, though in some embodiments allowing total user configuration may be desirable.

Once preferred local backup storage 107 is calculated, consideration may be made to ensure sufficient free storage locally. In an exemplary embodiment, at least 20 percent of fixed storage or 10 GB is reserved as free, that is, not used by any backup software processes (including temporary space required for backup creation). In one embodiment, if fixed storage 111 is plentiful, an extra percentage (based upon any reasonable formula) may be allocated for backup storage 107. Allocating extra backup storage 107 may be done, in the preferred embodiment, particularly if the computer 100 has a sufficiently acceptable reliability 250, particularly in regard to network bandwidth 253 and connectivity 254.

Local backup storage 107 may be allocated 24 in a variety of ways, depending upon requirements and file system. Different local storage algorithms may be used in alternate embodiments, or may even differ on different computers in the same embodiment. A first method is to create a file which acts as a virtual disk volume. This method is used for the commercial product PGPdisk sold by PGP Corporation. A second method is to integrate the backup files 138 within the file system, making backup files invisible and/or placing files within a hidden, inaccessible (to local users) folder. The backup files 138 in the preferred embodiment are encrypted 35 and inaccessible to users (as is a backup index 222 or index directory 221). In the preferred embodiment, flexibility in local backup storage 107 allocation is preferred, to allow reclamation if required. File system integration, the second method described, may be preferred for its flexibility.

Security may be a deciding factor in the method used allocating local backup storage 24: in the preferred embodiment for reciprocal anonymous backups, a local computer user has no access to the disk space allocated for others' backups 107. If a less flexible method facilitates better security, which may be an operating-system dependent condition, the more secure method may be preferred.

Local backup storage 107 may be on a single disk of a user's selection, a single disk based upon available free storage and/or usage patterns, or spread across multiple storage devices 110 based upon a software algorithm, such as taking a percentage of each fixed disk 111, or taking into account user preference. Virtual volumes comprising multiple physical disk drives are known to those skilled in the art, and merit no further explanation herein. A computer 100 may house multiple backup storage repositories 107.

Disk usage patterns may be discerned by examining file system usage to find which disk(s) are used to store the operating system, executable program, and data, and as well the changes in disk usage based upon file creation and modification dates, as well as file sizes. In one embodiment, if user data is stored on one disk, with operating system and programs on another disk, the OS/program disk may be preferred if sufficient free storage is available, as that disk is typically less subject to allocation change.

In various embodiments, local backup storage 107 may be reclaimed if required locally. If the local backup storage 107 is not filled, it may be repartitioned or otherwise allocated to deliver more user-available local storage 102. If repartitioning is problematic, space within the backup storage 107 may be used, at least temporarily, for local storage 102 needs. If local backup storage 107 is filled, a backup 138 may be moved 30 or disposed 86 to make room. The moving 30 or disposal 86 schedule may be disrupted and adjusted if necessary. Under such circumstances, the backup locations 224 in the backup index 222 should be adjusted accordingly.

Referring to FIG. 6, if sufficient local storage is not available 21, remedy local storage requirements 23. Remedying local storage requirements 23 may be done in a variety of ways, depending upon embodiment. In one embodiment, the backup software may inform the user to make a choice of remedy. Remedies may include measures to reduce required allocation requirements: 1) lessen backup selection 209; 2) lessen redundancy 302; 3) shorten disposal age; 4) lessen frequency. Remedies may include measures to exceed preferred operating margins: 1) tolerate using more disk space, leaving less free; 2) allow usage of removable storage 112 for backups 107; 3) tolerate a lesser contribution by this computer 100 of backup storage for others 107.

Figure 8:
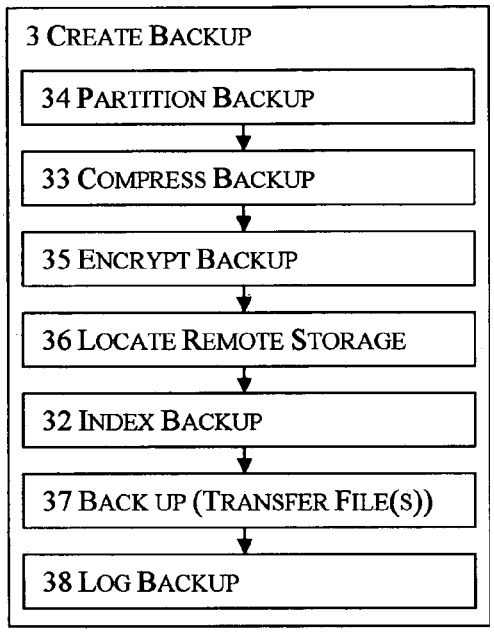
FIG. 8 depicts the backup process.

FIG. 8 depicts an exemplary backup process 3. In various embodiments, the steps may vary in sequence, or, in some embodiments, certain steps may be skipped.

While many of the files selected 209 for backup may not be compressed 33, the preferred embodiment is backup file compression prior to encrypting the backup 35. Numerous file compression techniques going back for decades are known to those skilled in the art, and merit no description here. Any form of compression may be employed that meshes with other requirements, such as performance (the time it takes to create and/or restore a backup). Compression ratios can be quite high, and in one embodiment a compressed backup may be used as the basic for estimating local storage requirements 4. Encryption 35 may be integrated with the compression process 33. In the preferred embodiment, the process of creating a local backup starts with compressing 33 the selected items 209 into a compressed file using available local storage 102. If partitioning is employed, splitting a backup into portions 34 may be the first step in creating a backup, then compressing 33 and encrypting 35 each portion 108. Alternately, a backup file may be compressed 33 and encrypted 25 prior to partitioning 34, perhaps using the backup index entry 235 to put together different portions 108 based upon file sizes or other indicia, such as an identifier within the backup file itself.

The backup software must also take into account leaving sufficient required storage 102 to create backups 3. In the preferred embodiment, a sufficient portion of local retention storage 110 based upon backup selection 209 is ensured (essentially, reserved) for temporary use in creating backup files 108. Different strategies for minimizing local storage requirements for creating backups may be employed, such as streaming, that is, spooling backups incrementally through the network during the creation process rather than creating a backup file locally and transferring it in toto. A backup may be incrementally created and multicast to destination locations, for example, in which case the first step in the backup creation process 3 is locating remote storage 36. U.S. Pat. No. 6,704,849 (Steegmans), herein incorporated by reference, discloses streaming backup data through a network.

Figure 11:
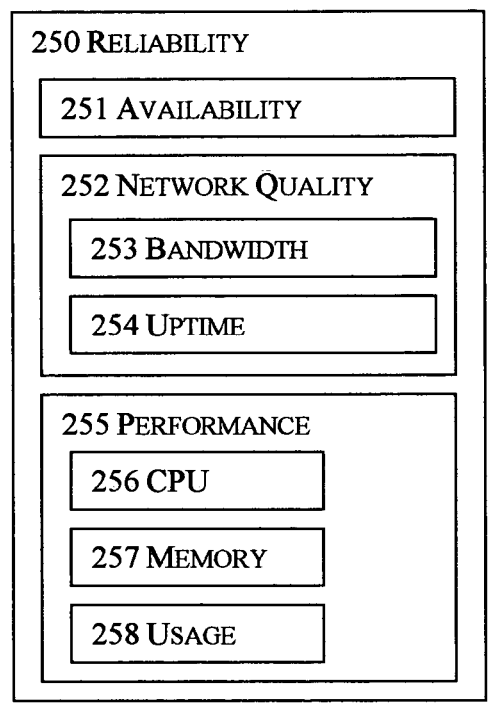
FIG. 11 depicts reliability aspects.

Referring to FIG. 11, the reliability 250 of the participating computers may be assessed. A computer left on continuously with always-on broadband connections (and sufficient storage) provides an ideal backup depository. Conversely, a sporadically switched on computer accessing the network through a slow dial-up connection is a poor candidate to deposit someone else's backup: retrieving a backup would be problematic.

A reliability estimate may be initially determined by a questionnaire to the user, though this approach is not recommended, as it is tedious to the user. Reliability 250 may be determined and confirmed by testing and monitoring. One aspect of reliability 250 is availability 251; in other words, on average, how many hours a day the computer is on. Another aspect of reliability 250 is network quality of service 252, relating to both bandwidth and consistency. A third aspect of reliability 250 is computing power 253, relating to both processor capability and memory capacity. A fourth aspect, the most obvious, is how much space is available for backup 137.

In the preferred embodiment, reliability 250 is expressed quantitatively based upon threshold measurements, where monitoring occurs over a designated time period, and where monitoring, if not continuous, is performed periodically. For example, the quantitative measure of average availability 251 may be (hours per day uptime/2.4) to derive a rating from 0-10. Availability 251 may be measured locally by logging startup and shutdown times to calculate daily on-time duration. In the preferred embodiment, reliability monitoring is done by logging necessary information.

The quality of service (QOS) of network connectivity 252 may be assessed using techniques known to those skilled in the art. U.S. Pat. Nos. 6,112,236 and 6,470,385, among others, disclose techniques for estimating network quality of service 252. Computers within the defined network using the backup software may be used to bounce status message off for monitoring purposes. Estimates of network bandwidth 253 and uptime 254 are required to make a decent quantitative assessment, where bandwidth 253 is a mean or average estimate of data throughput, and uptime 254, which is a mean or average estimate of computer network availability measured in number of hours per day. On a scale of zero (low) to ten (high), for example, an always-on broadband connection may rate seven to ten (with a bandwidth 253 measure to differentiate). In one embodiment, a broadband connection may be required for operation of the backup software, particularly if the size of the backup 209 exceeds a predetermined threshold.

For simplicity in description, relatively simple reliability measurement may be relied upon, resulting in a simple reliability rating 250 of one to ten in an exemplary embodiment.

In one embodiment, a user may not be allowed to participate in using the backup software if the local computer 100 does not meet a minimum standard of reliability 250. In one embodiment, a computer scoring zero or one on a reliability scale of ten high may be ineligible, as backup software functioning is likely to disappoint or fail the user. Better to tell a user something won't work than provide false hope, especially when reliability 250 is an essential aspect of the process.

Leaving the computer on for a sufficient time to allow backup may be an issue, both for local 108 and remote 138 files. In one embodiment, using an incremental scheme for local files 108, backup occurs after a file on the backup list has been changed. For example, backup may occur just after closing a document; it is increasingly common for files to be locked while being used by an application. In various embodiments, the software may attempt to dissuade a user from switching off the computer 100 if backup is due, or fake shutdown to allow backup, or promise to shut down after backup, or shut down all but internal operations until after backup, then shut down. The preferred embodiment if a user attempts to shutdown with a pending backup is to offer to shut down automatically after backup, allowing the user to shut down, overriding backup (and thus negating any backup not completed).

Referring to FIG. 8, in the preferred embodiment, encrypt backup files 35 prior to transfer 37. In an ersatz embodiment, encryption is not employed. Obviously, the encryption scheme should be set up prior to file encryption 35.

Data security may be considered essential to the concept of backing up files to an unknown remote computer. PGP Corporation, sells a product called PGP, an acronym for "Pretty Good Privacy", which offers a variety of data security services based upon public key encryption, including popular public-key encryption applications such as secure message transmission and digital signatures. One PGP application is user-selectable virtual disk encryption, called PGPdisk, allowing private-key password-protected file storage.

Numerous encryption algorithms are known to those skilled in the art. The word cryptography dates back at least to the year 1658. Some of the more popular encryption algorithms nowadays include AES, CAST, DES and its derivatives, including TripleDES (when a single DES just isn't good enough), IDEA, RSA, Twofish, and Blowfish. Likewise, application of techniques involving encryption, checksum, and digital watermarking to ensure security and integrity are a subject well explored and known to those skilled in the art, the specifics of which thereby meriting no further description herein. In one embodiment, the encryption algorithm employed varies between computers or applications of encryption, with the variance achieved by random, pseudo-random, or user selection, with encryption algorithm identification securely stored on the local computer 100, or embedded elsewhere on a remote computer, including within the encrypted files or backup index 231, identifying the encryption used, where the encryption identifier itself is secure, perhaps based upon a hashed index table, where the index numbers are random or pseudo-random generated numbers. Similarly, backup index 222 entries 235 may include a checksum 233 or similar indicator to assure backup integrity.

Referring to FIG. 8, index a backup 32. As depicted in FIG. 12, each backup has an index entry 235 for a variety of uses, including allowing reconstruction from constituent portions 223, and allowing identification of contents 227. The index 222 is in the preferred embodiment retained locally, and an index entry 235 included with each portion 223. In alternate embodiments, a backup index 222 may be retained only locally, or backup index entry 235 only with the backup 108. If multiple backup indexes 222, a backup index directory 221 on the local computer 100 may be used to locate backup indexes 222. Similarly, a backup index 222 may comprise at least in part references to backup index entries. Given the relatively small size of backup index entries 235, ready availability is recommended.

Referring to FIG. 12, suggested components of a backup index entry 235, which may vary by embodiment, include the following: an identifier 232, used to uniquely identify the backup; the portions 223 into which the backup is divided, if portioning 34 is used; the locations(s) of the backup 224 portions; the source location(s) of the backup (nominally corresponding file directories/names, but may include other information); the contents of the backup 227, which correspond to the source location(s) 225, but which may include information about file types, attributes, and possibly descriptive information, such as a document summary if obtainable; the date and time the backup was created 226; an optional disposal age or retention policy 228; an optional move schedule 229; a version history 230 (used with modification backups or other versioning techniques); an indicator of the encryption used 231, if encryption varies; an integrity check 232, such as a checksum for the backup; and a slot 238 to indicate the backup's relation with other backups, including redundancies. The relation 238 may state, for example, that a backup is incremental to another backup, or a base backup upon which differential or incremental backups are based. The identifier 232 may uniquely identify the backup and as well allow identification of the computer from which the backup emanated.

Backup indexes 222 and entries 235 may vary depending on their location and use. In an embodiment where a backup index entry 235 is kept both locally and with the remote backup, index entry 235 contents may differ. For example, for security reasons, in an embodiment where the encryption algorithm for files may vary, the remote backup index entry 235 may lack the encryption indicator 231, with the encryption indicator 231 retained only locally. Similarly, in an embodiment where a backup identifier 232 is used in a backup index entry 235, the backup index entry 235 with the remote copy may not list the contents 227; only the locally-retained copy of the backup index 222 may list the contents 227.

The location(s) of the backup 224 may include the reliability of the backup computer 250, as a helpful indicator of which remote computer to prefer restoration from. In one embodiment where the location field/object 224 lacks reliability 250 data, given a backup location identifier 224, the locator software 185 may be queried for the reliability 250 of the backup computer. Note that the backup location 224 may not be a network address, but an index or other reference into the locator index 286. This scheme may allow the local computer ready access to the backup index 222 while maintaining security with regard to the network addresses of remote computers 130 used for backup.

If one embodiment, the backup locations 224 in an index entry 235 may list the locations of all backup copies. This embodiment may be useful for a file-by-file backup, for example, so that only a single index entry 235 is required for each backed-up file.

In an embodiment where the backup software is integrated with the operating system file system, a backup index entry 235 may be integral to the file description information resident to the OS file system.

Portions of a backup index 222 or index entries 235 stored with a backup may be accessible to remote computers 130 storing backups 108 without breaching security and allowing backup maintenance. For example, the move schedule 229 and disposal age 228 may be accessed locally to facilitate backup movement 30 and disposal 86.

FIG. 12 depicts a hierarchy of three tiers: backup index directory 221, used to contain or track backup indexes 222, which hold or refer to backup index entries 235. This organization offers considerable flexibility in backup management, both for managing backing up local files 104 and managing remote backups 138 stored locally 107.

Fields/objects described for backup index entries 235 may in some embodiments be referred to or duplicated in the corresponding backup index 222. For example, a backup index 222 may also identify the date/time 226 of each backup, thus serving as a manifest of backups.

In an embodiment using backup indexes 222, particularly with some fields/objects redundant to an entry 235, it may be considered acceptable to have backup indexes entries 235 not retained locally, but embedded along with backup portions 223, though this is discouraged, as it would not allow a user to identify backup contents 227 as quickly as retention in local storage 110. The backup software should offer user convenience at the expense of modest storage overhead.

In one embodiment, to manage the backup of local files 104, there is a backup index 222 retained locally, which references each local backup index entry 235, and a backup index 222 or index directory 221 for the local storage 107 which stores remote backups 138. In an alternate embodiment, there may not be a backup index directory 221 or index 222 for remote backups 138 stored locally 107, instead relying upon remote commands to direct the local backup software as required to access, move 30 or dispose 86 backups 138.

In one embodiment, there is a backup index 222 for each computer having a resident backup 138 in local storage 107, with backup entries 235 for different backups, with a backup index directory 221 to the backup indexes 222.

In an embodiment where backups may be appended to through time, a backup subject to expansion has a backup index 222, thus allowing backup appendages (which may only have backup index entries 235, and a reference to the appended backup index entry 235 in the backup index 222); in this embodiment, a top-level index directory 221 may be used to reference all backups stored locally 107, with each index directory 221 entry comprising sufficient data for ready access to backup indexes 222. This scheme works well for modification backups.

Referring to FIG. 8, locate remote storage 36 as destination location(s) to transfer backup portion(s) 37 to using one or more criteria, including current storage capacity for a backup 184, reliability 250 and availability 251.

Figure 13:
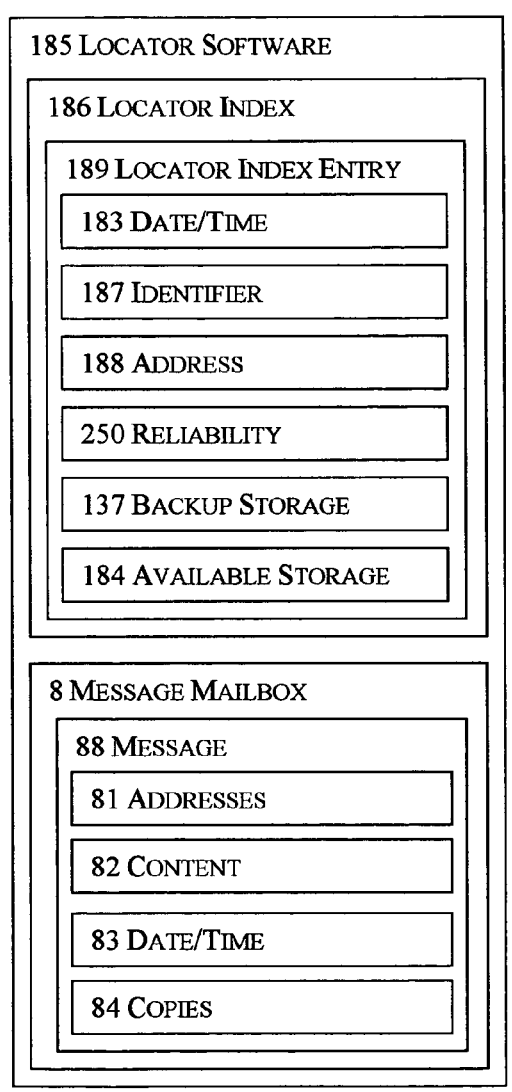
FIG. 13 depicts aspects of a computer locator service.

Referring to FIG. 13, a locator service 185 is used to locate remote storage 36. Locator software 185 is an essential aspect of the disclosed technology. A locator 185 maintains an index 186 of computers available for remote storage. The index entry 189 components may vary by embodiment, but suggested are: an identifier 187, address 188, usage pattern 251, reliability rating reliability 250, storage available for backup 137, currently available storage 184, and the date/time 183 when the latest information regarding remote storage was updated.

In one embodiment, computers' usage patterns may be monitored as a gauge of availability 251, and used as a factor in the process of selecting backup location 224. For backup location selection purposes, a computer's usage 251 relates to compatibility in hours of operation and days of the week. For example, if the local computer is typically on 08:00-21:00 GMT, the locator 185 may prefer a backup computer 130 with similar reliability 250 and usage pattern 251.

Referring to FIG. 13, some data in the locator index 186 is more important to the locator 185 in making a storage decision than other. Available storage 184 is of course crucial. Reliability 250 may be considered of secondary importance. Availability 251 may rate a third level of significance, unless usage pattern 251 is constricted to a degree that it materially affects computer availability. A factor threshold may be used to determine whether a change in a computer's condition relative to backup quality is significant enough to merit notification to other computers, or, given slight change, whether current status is made known only upon request. For example, broadcast notification may be merited if available storage changes by more than 15%, or the greater of 15% or the average backup size 239 currently resident on in storage 107 or remaining available backup storage less than the largest backup currently resident (and so on, as far as such rule complexity may proceed).

A major design decision is whether a centralized locator service 185 is used, or locator software 185 distributed (and to what degree of distribution). One system envisions centralization, both with locator software 185 and perhaps backup storage, with participating computers playing contributory parts at most. While aspects of the disclosed technology are revelatory in this architecture, this follows the trend of the prior art towards centralized backup storage. The other extreme is peer-to-peer, more in line with the basic tenet of anonymous reciprocity to which this technology is directed. Considering the current state-of-the-art in powerful desktop computers, and increasing market penetration of broadband network connectivity, peer-to-peer is certainly practical and cost-effective. There are of course, as disclosed herein and anticipated, embodiments where performance and reliability are enhanced by taking advantage of highly reliable server-based systems, while using personal computers for storage and non-critical functions (locator software 185 ultimately being a critical function).

In one embodiment, locators 185 may be tiered (a hierarchy) such that there are one or more primary locators, with secondary locators, where participating computers are allocated access to one or more locators (preferably at least one primary locator and one or more secondary locators). Reliability is a prime driver in design of such an embodiment.

In one embodiment, a locator's 185 network address is distributed with the backup software. If the backup software requires registration to initiate use, the locator's address may be given during the registration process. In some embodiments, using a level of indirection, a locator's address may be accessed from a preset address installed in the software at some time. In an exemplary embodiment for use within a corporate WAN, the software may access a locator's address via a local LAN, where there are multiple locators 185, one for each LAN, with each LAN locator knowing the addresses of other LAN locators, or perhaps the address of a master WAN locator, thus constituting a hierarchical locator service. Security concerns, and firewalls may factor into the best method for locating a locator 185. Those skilled in the art are familiar with various ways in which a network address may be presented to software; any method appropriate to the application environment suffices.

In a purely peer-to-peer embodiment, each computer maintains its own locator service 185. This embodiment's system may be organic, with dynamic collection of remote backup locations 137. An initial address seeding from another participating computer 130 may be sufficient to start the locator service 185 with addresses for remote storage 137. The backup software itself may be distributed by a participating computer. As new computers participate, these computers 130 may become known through a networking process of locator service 185 communications between locators 185 on different computers. An exemplary embodiment using a LAN backup system may identify and utilize accessible computers on the LAN for remote storage 137, regardless of a computer's participation (assuming that a computer has sufficient access privileges to maintain remote backups).

In the preferred embodiment, the locator 185 has at least an index entry 189 for each computer holding a backup of local files 108. In alternate embodiments, as aforementioned, a locator 185 may rely upon another locator for partial or complete locator index entry 189 information.

The locations of backups 224 may be kept unknowable to the backup software, and maintained securely by the locator service 185. In such an embodiment, using a level of indirection, the backup location 224 in a backup may refer to an index number into a table maintained securely by the locator 185.

A locator 185 may develop a list of regular and/or preferred backup locations 224. This listing may comprise computers of various reliability ratings 250, used for first-line backup (highest reliability) to lower reliability 250 locations 224 for aged backups, that is, to move older backups to. The preferred list may be developed based upon compatibility, such as similar reliability 250, perhaps with particular regard to congruent usage pattern 251.

In one embodiment, the locator service 185 may act as a filter to limit backups to a range of computers, such as confining backups to a particular LAN or subnetwork. In one embodiment, the locator service 185 may act as a filter to limit backups to a range of computers with a similar reliability rating 250 to the local computer 100, or some other factor, such as usage pattern 251. This filter may apply only to recent (initial) backup, with later backups aging in movement to other computers. For example, second-rate reliability 250 computers may lack access to first-rate reliability computers for backup storage. Continuing the example with an operational reliability range of 1-10, a computer may store backup files at best on a computer with a rating one higher than the local computer. Alternately, some trade-offs may occur such that a highly reliable computer tolerates lower reliability computers storage in exchange for storing a larger volume of backups. In other words, a slower machine with plenty of excess storage capacity may parlay that advantage to accessing a more reliable computer for its backups. Once again, rule-based algorithms with such trade-offs are anticipated.

Locators 185 communicate with each other at various times. For example, when a change occurs, such as a significant change (threshold driven by percentage or absolute size) in a computer's backup available storage 184, or other locator index data 186, a message may be multicast to selected or all other locator services. Alternately or in addition, locator index data may be updated by reply to query from other locators 185. Similarly, if reliability 250 changes, that change may be prorogated via multicast to other locators, particularly locators having backups resident, or be made available upon request.

In one embodiment, a computer communicates through the network to the appropriate computer(s) anytime changes are made to a backup. For example, a remote computer 130 may notify the source location 225 when it moves 30 or disposes 86 a backup. Alternately, the backup index software maintenance software may make a forwarding reference in the backup's index entry 235.

Referring to FIG. 13, in one embodiment, locators 185 form a network messaging service. Each locator may have a message mailbox 8 to hold storable messages 88 for other locators 185 which cannot be reached at the time just prior storing a message (in other words, a message 88 is stored because the computer cannot be immediately communicated with). A message 88 may comprise a check-off list of addressees 81, message contents 82, a date/time stamp to indicate when the message was created 83, and a list of the other locations where copies of the message 84 exist. What each message contains may vary by embodiment or usage.

For convenience in handling (creating and receiving), a network communication may take the same or similar form as a storable message 88. Network message communication has an extensive history and is trivial to those skilled in the art, requiring no description of details herein.

The messaging service 8 is used when direct communication to another locator 185 fails. For example, a locator 185 attempts communication to other locators; it fails. The locator 185 creates a message 88 with addressees 81 being all other locators 185 that it could not communicate at the time, and retains it in its message mailbox 8. When an addressee 81 contacts the locator which created the message 88, the addressee reads that locator's message mailbox 8 to see if it has any messages 88. If it finds a message 88, it marks itself as having read the message (a 'read' flag associated with the addressee 81 may suffice), and takes action based upon content 82 of the message 88.

A message 88 may also comprise a list of locations which have copies 84 of the message 88. A locator 185 may propagate copies of a message 88 to improve probability that the message 88 is read as soon as possible. Message copy propagation may be limited to a pre-shutdown task, thus allowing the message 88 to be read when the computer that created the message is offline. Message propagation may conform to locator hierarchical communication protocols 197, in an embodiment where such hierarchical communication is employed. The computer propagating a message 88 may recall its message copies from other computers when it comes back online. An addressee 81 and/or the message originator 185 may notify other locators having copies of the message 88 to check-off that a message 88 has been read. In the case where a computer goes offline after propagating a message 88, it may learn, after it comes back online, that the message was read during the message recall process. After all addressees 81 have read the message 88, the message 88 is deleted. It is well-advised to keep the rules of messaging simple, and not needlessly propagate stored messages 88: particularly avoid creating a message to delete previous messages. In the preferred embodiment, messages 88 may be disposed after a certain duration from creation, regardless of read status. A series of unread messages 88 for a particular computer after a certain duration may be an indicator of absence.

If communication is not readily made because a computer is offline, backup software may try again after a set period of time. Local 100 backup software may keep track of where its backups are 224, and send "ping" notices to backup hosting software on remote computers (130 and 140 in FIG. 2, for example) when the computer comes online and goes offline; this facilitates backup maintenance and optimizes knowledge of availability 251.

Figure 16:
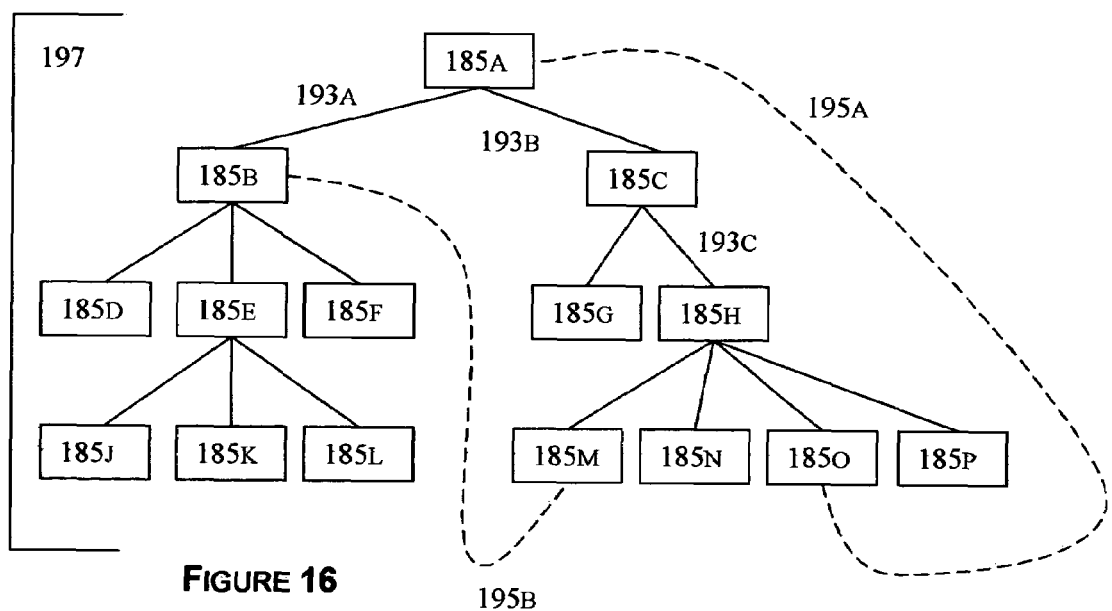
FIG. 16 depicts hierarchical communication between locators.

Referring to FIG. 16, to minimize network activity while maximizing information dispersal, locator services 185 may communicate in a hierarchical manner. The hierarchy may be stored as part of a locator index 186. In one embodiment using hierarchical communication, locator services 185 may maintain in their index 186 computers which have backups of the local computer 107. For example, FIG. 16 depicts computer locators 185 with index listings and nominal communications using hierarchical communication 193, with exceptions 195 where a computer has a backup.

Locator hierarchy 197 levels may be based, at least in part, upon reliability 250. For example, referring to FIG. 16, computers for locators at the same level 185*b*, 185*c* may know of each other, and as well select computers at lower and higher reliability levels 250.

As a means of burden sharing, locators 185 may apportion index 186 maintenance among themselves. This is depicted in FIG. 16, where locators 185 at the same hierarchy level are depicted as maintaining connection with a similar number of other locators 185 (185*b* has three computers directly below it (185*d-f*), while 185*c* has two (185*g-h*); similarly, 185*e* has three computers below it (185*j-l*), while 185*h* has four (185*m-p*)).

Locators 185 may act as a reference service to other locators 185. For example, with backup storage 107 filling in some known computers at a certain reliability level 250, a locator 185*e* may request from another 185*h* recommendations of computers it knows with reliability 250 in a certain range. Using multicast, a locator 185 may simultaneously inquire from several computers.

Locator index entries 189 are in the preferred embodiment communicated securely, as is all transferred or communicated data which may compromise the integrity of the backup system.

In one embodiment, to minimize local storage 102 required, backups may be processed as a stream, transferred 37 incrementally during the backup construction process. Once the locations of the remote backup addresses 224 are known to which the transfer 37 is going, and the final processing step prior to transfer has begun, such as compression and encryption 35, rather than spool the backup file to temporary local disk storage, spool the file to its remote destination. As each chuck is compressed 33 and encrypted 35, it is transferred 37. This embodiment has the drawback of not offering local recovery if network transfer is interrupted, so may be recommended only under certain conditions, such as a small backup, local storage 102 is scarce, and/or network reliability 252 is high. Then again, if the backup process aborts for some reason, it can always be tried again later.

To implement redundancy, backup transfer 37 may be multicast to the selected backup locations using any available and appropriate technique. Concepts and implementations of network multicast are known to those skilled in the art. Multicast techniques are disclosed in U.S. Pat. Nos. 4,760,572, 4,740,954, 4,864,559, 5,557,798, and as well hundreds of other patents which reference these seminal patents on this particular technology.

Referring to FIG. 7, in the preferred embodiment, log each backup 38. In one embodiment, the log references the backup index entry 235. In the preferred embodiment, the backup index 222 and backup index entry 235 act as the log.

Figure 14A:
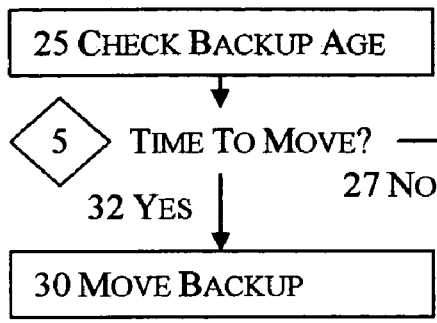
FIG. 14 depicts backup aging and disposal processes.
Figure 14B:
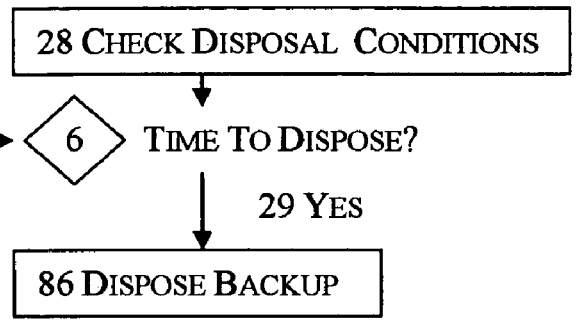
Figure 15:
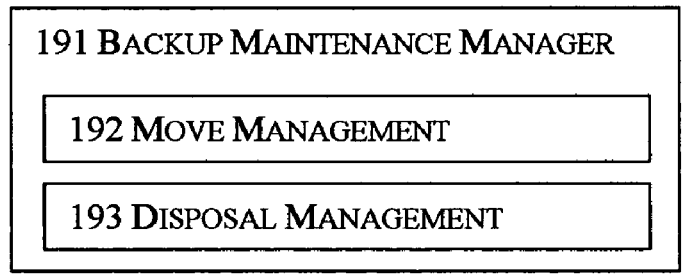
FIG. 15 depicts backup maintenance.

Referring to FIGS. 14 and 15, one or more software modules may be responsible for local backup maintenance management 191, that is, for remote backups 138 stored 107 locally. Besides storage space optimization as required, there may be two significant backup management aspects: backup movement management 192, and disposal management 193. In one embodiment, the local computer 100 manages its remote backup storage 107, and can read, and possibly write, pertinent information from backup indexes 222 and backup index entries 235 accompanying the backups.

Different rule-based algorithms may be used to trigger backup movement 30, retention, and disposal 86. Backup movement 192 is an optional but recommended feature.

Referring to FIG. 14a, backups may be moved between computers. Specifically, in one embodiment, a backup may be moved to a less reliable 250 computer 130 as it ages. This facilitates optimizing the highest quality backup storage to the most recent backups, which are most likely to be required for restoration. As mentioned in the background, U.S. Pat. Nos. 5,367,698 and 5,537,585 examine issues related to archival file migration. U.S. Pat. No. 5,537,585 (Blickenstaff) particularly has relevant disclosure to this aspect, and is herein incorporated by reference.

Referring to FIG. 12, a backup index entry 235 may include a move schedule 229, allowing the computer 100 hosting a backup 138 to periodically search its local backup storage 107 index 222 to locate backups subject to movement 192.

Backup move schedules 229 and movement itself 30 may be rule-driven based upon a trade-off in factors such as available storage 184 at different levels of reliability 250, redundancy 302, and retention/disposal policy 228. For example, with three backups, and a planned disposal of two copies after three months, a movement schedule 229 and disposal setting 228 may be created individually for each backup copy: first backup moved after one month and disposed after two months, the second backup moved after six weeks and disposed after three months, the third backup moved after two months to a less reliable computer, then back to a more reliable computer after three months, if the backup is still required (has not been rendered obsolete).

Backup schedules 229 and retention policy 228 may be changed in time. A file 104 may become obsolete, accelerating movement 30 and disposal 86 of its backup. A redundant copy may be lost, and a backup moved to a more reliable computer (or another copy made, with new schedules for movement 229 and retention 228). A computer's backup storage 138 may be filling, and that computer may decide to request and/or move 30 backups, or request from the backup source computer permission to dispose 86 a backup. The value of a backup may increase such that retention policy 228 changes to safely archive one or more copies.

Backup movement 192 necessitates altering the backup location(s) 224 of the backup's index entry 235. Once a backup is disposed 86, its backup index entry 235 too may be disposed. In one embodiment, a backup index entry 235 is retained for a duration after backup disposal 86, at least allowing a user to see what the backup 108 contained.

In the preferred embodiment, the source location 225 and other backup locations 224 are notified when a backup movement 30 is made. Notification communication may be kept as part of the move schedule 229 indicator, serving as verification to the scheduled movement.

As suggested in U.S. Pat. No. 5,537,585, a backup index entry 235 may include a placeholder to indicate the location to which a backup was moved. The backup location 224 may serve as a forward reference when a backup is moved 30.

In one embodiment, a backup schedule 229 and backup movement 192 for a local computer's backup may be predicated upon that computer's reliability 250, with consideration for the aging process. Consider an example of a three-copy redundant backup occurring periodically, where an operational reliability 250 rating of 1-10 is used, with the local computer 100 rated 6. The local computer 100 having 3 redundant backup copies may be entitled to a single backup copy on a computer with a reliability 250 rating up to two levels higher than it, a single copy on an equivalent reliability computer, and a copy on a slightly less reliability computer. So, for example, backups for the reliability level 6 computer may reside on 8, 6, and 4 reliability level computers. This backup scenario may be sustained for a set number of subsequent backups. So for example, after two subsequent backups, the 8-6-4 backup may be moved to 6-4-2, shifting the 8-level backup to a 2-level computer. After four subsequent backups (two more backups than the first shift), the 6-4-2 backup may be shifted to 4-2-1 (moving the 6-level backup to a reliability level 1 computer). After six subsequent backups, the 4-level backup is disposed. After eight subsequent backups, the 2-level backup is disposed. Finally, after ten subsequent backups, the level-1 backup is disposed.

In one embodiment, a backup may be specified for long-term retention, subject perhaps to movement 192, but not disposal, until triggered by the local backup software. Long-term retention may be useful for archive data not subject to current modification.

Backup movement 192 may seem to introduce the issue of network congestion, but this should not be a problem given scheduling backup movement 30 at off-hours (at night and on weekends, for example), and generally at a lower priority than backups themselves 12.

If backups are move-managed 192, it makes sense to partition 34 or arrange a backup regime that avoids requiring movement of large amounts of data.

Referring to FIG. 14b, backups age replaced by more recent backups should be disposed of 86. Also, computers may exit participation, and their backups removed. Check whether conditions exist that merit disposal 28. If so 29, dispose the backup 86. A simple system of backup aging and disposal may be employed based upon retention policy 308, where backups are disposed after a set duration or number of subsequent backups. In the preferred embodiment, backup locations 224 are notified when a subsequent backup is made, or the backup software uninstalled on the computer owning a backup. Referring to FIG. 12, a backup index entry 235 may include a disposal age 228, allowing the backup software on the computer hosting the backup to periodically search its local backup storage 107 index 222 to locate backups subject to movement 192 or disposal 86, and act accordingly.

When a computer uninstalls the backup software, in the preferred embodiment, the user may be queried whether backups 108 should be disposed 86. Basically, this allows the user to indicate whether the backup software is being temporarily uninstalled (to be reinstalled, for whatever reason), or whether the backup software is being decommissioned, for which backups should be disposed 86. In one embodiment, after removal of the backup software, a small background task for disposal management 193 may remain, itself subject to self-destruction after a set duration by prompting uninstalling itself. The purpose of this background is to watch for reinstallation. If reinstallation does not occur, the backup software notifies other computers (by retaining sufficient locator 185 information to do so) to dispose backups 86 belonging to this computer 100. This background task eliminates the need to ask or trust the user regarding backup removal 193.

Absence should be considered: the scenario that a participating computer ceases backups with no notification. The preferred embodiment is a backup index entry 235 exist with each backup, listing at least the disposal age 228 for a backup, and that the disposal age 228 may be translated to a specific day or point in time. Unless the set disposal age 228 is extended, the local disposal maintenance monitor 193 disposes 86 a backup on schedule.

In an embodiment where communication by locator services 185 is routine, absence may be determined by lack of response over a number of tries at different times, particularly at times of previously known availability 251, or an unread message 88 for a set duration if messaging if employed. A conservative regime is recommended in determining absence and subsequently accelerating aging or outright deleting backups 86 of the absent computer.

Figure 9:
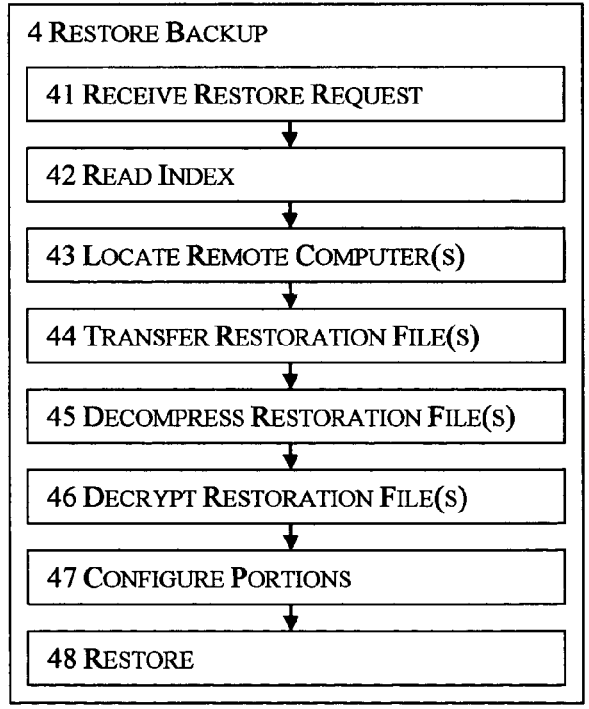
FIG. 9 depicts the restoration process.

FIG. 9 depicts the backup restoration process 4. Backup restoration processes 4 are well known to those skilled in the art, but an explanation is provided consistent with exemplary embodiments disclosed herein. First, restoration software receives a restoration request 41. Next, the software reads the log or index 42 for required information. In the preferred embodiment, a local backup index 222 (or combination of backup indexes 222) contains a complete list of backups 108 for any selected item.

In an embodiment having a user-interactive restoration process, the restore software 4 may display the contents of the backup, so that a user may select all or part of a backup for restoration.

Figure 4B:
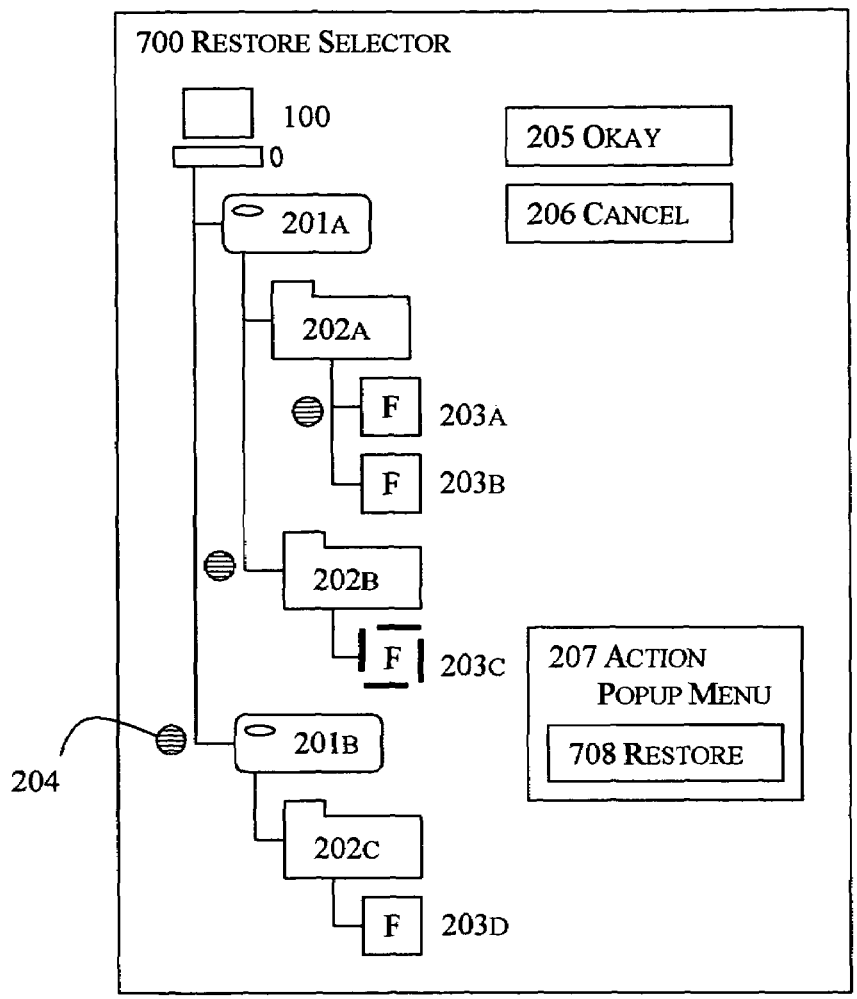
FIG. 4*b* depicts restoration selection.

FIG. 4b depicts an exemplary restore selector 700. The restore selector is much the same as the backup selector 200, but with a menu item 708 in the action popup menu 207 allowing a user to select restoring a selected item 203c.

Figure 4C:
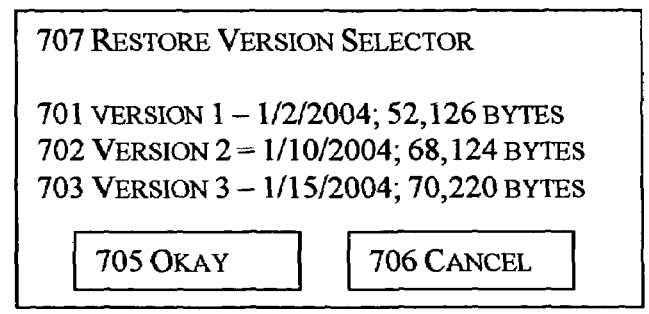
FIG. 4*c* depicts an exemplary restore version selector.
Figure 5:
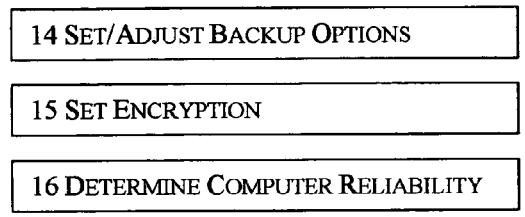
FIG. 5 depicts miscellaneous backup processes.

Referring to FIG. 4c, once an item is selected, a listing may appear allowing user selection of a particular version to restore 707. Sufficient information should be presented if possible to allow a user to make an intelligent choice. The information presented for user version selection 707 is in the preferred embodiment kept in one or more backup index entries 235.

Continuing with FIG. 9, once a selection is made, the restore software attempts to connect with the remote computer(s) 43 to determine whether restoration may occur. In an embodiment with redundant backups, where the backup index 222 gives the reliability 250, the restore locator 43 may prefer the highest reliability computer available, or at least an available computer with the best network quality 252 or bandwidth 253. A computer 100 may need to wait for a remote computer 130 holding a backup file 104 desired for restoration 4, perhaps using the aforementioned messaging system to expedite the process.

Continuing with FIG. 9, once a remote computer 130 is located, the restorer uses the backup index 222 to locate and transfer the requested restoration files 44. Upon receipt of the backup files, if the files are compressed, the files are decompressed 45. If the files are encrypted, the files are decrypted 46. Decryption 46 and decompression 45 may be a unified process.

Continuing with FIG. 9, the last steps of the restoration process involve configuring the portions of a backup 47 if the backup comprises multiple portions 108, and restoring the files 48 so that the user may access them. In an embodiment having a user-interactive restoration process, the restore software 4 may afford the user a choice of replacing an existing item, or place the restored items in a specified location, such as a "Restore" directory. Even if the user selects to replace an existing item, good user interface practice is that the existing (not replaced) version be available in case the user decides to "undo". In one embodiment, the restorer 4 may be default place restored items in a "Restore" directory, informing the user when and where restored items are available.

Restorations may be logged: the backup software tracking all activity related to backup and restoration.

Restoration 4 may require merging incremental or differential backups, this is, configuring from multiple portions 47. The preferred embodiment is providing a fully restored file, not require user decision in putting pieces together. As described referring to FIG. 4c, the user should be presented the convenience of selecting a version 707 which appears fully restored. In one embodiment, a user may be shown, as an advanced option, changes made to a document between the current version and one or more backups (or between backups), and allowed to select which components or sections are to comprise a merged document, with software subsequently performing the merge as requested.

Many of the same concepts disclosed herein may be applied to local backups to different local folders 202 or drives 201.

Security may be a significant issue in application of the disclosed technology. Different components of the backup software may communicate through strict interface protocols, thus limiting information flow to authorized and required data access only. The data contained in backup indexes 222 and locator indexes 186 in particular may be secured using any appropriate technique. Techniques to secure data, communication, and computer operations are known to those skilled in the art; any appropriate technique employed that meets requirements for the intended application suffices.

The disclosed technology may be used for file sharing in a peer-to-peer environment, with local allocated storage 107 an area reserved for file sharing. Selected files may be transferred or copied to storage either locally or remotely for distribution, with destinations controlled by locator services 185. What has been disclosed for the backup index 222 and entries 235 may be used as part of a distributed database, which may be searchable for file titles or contents 227. In this embodiment, security may not be an issue, or selectively applied to files with regard to copyright ownership and/or as part of a subscription service. In one embodiment of file sharing, the local storage area 107 itself may be secure, requiring software for access, and possibility limiting access via the file-sharing software only to the local allocated storage area 107 on the local computer 100.

The provided examples are not intended to be exhaustive of the possibilities, but merely illustrative concepts which may be implemented in combination in a variety of ways. Furthermore, different embodiments of different aspects may be combined as necessary to meet the requirements for the intended application of the technology. Such combinations and permutations are anticipated.

The invention claimed is:

1. A computer-implemented method comprising:
    determining a first file set by receiving user selection of at least one said user-stored first file residing on local storage for backup,
    wherein said user may exclude some said user-stored files from said selection,
    such that said selection does not comprise specification of the transfer destination of said first file;
    reserving a portion of local storage as inaccessible to said user usage,
    such that basing the portion size of said inaccessible local storage at least in part upon the size of said first set;
    locating over a network and selecting a first remote computer; and
    copying at least a portion of said first file from said local storage to storage on said first remote computer.

2. The method according to claim 1, such that selecting said first remote computer at least in part upon receiving data of a measure of reliability of said first remote computer,
    wherein said measure comprises, at least in part, data from monitoring usage of said first remote computer.

3. The method according to claim 1,
    such that receiving said user file selection occurs via at least one user-input device, and
    such that said locating said first remote computer and said selecting said first write-accessible storage occur without user input.

4. The method according to claim 1, further comprising:
    said local computer allocating remote-accessible storage,
    wherein said remote-accessible storage comprises at least a portion of write-accessible storage on said local storage for storing at least one file transferred through a network from at least one remote computer;
    a second remote computer locating said local computer over a network;
    said second remote computer determining a second file set by receiving a second user-determined selection of at least one second file residing on said second remote computer storage for backup,
    such that said selection does not comprise specification of the transfer destination of said second file;
    encrypting said second file set; and
    copying at least a portion of said second file set from said second remote computer storage to said remote-accessible storage.

5. The method according to claim 1, further comprising:
    receiving a user-specified redundancy level selection for maintaining a specified number of copies of said file backup selection.

6. The method according to claim 1, further comprising:
    adjusting the size of said reserved portion of local storage based, at least in part, upon said user input subsequent to said user backup selection.

7. The method according to claim 1, such that selecting said first remote computer for backup based at least in part upon at least one backup option set by said user.

8. The method according to claim 1, further comprising:
    integrating said user backup selection capability within a program allowing said user to view, select, and open files and file directories.

9. A computer-implemented method of allocating a portion of local storage for backing up files transferred from a remote computer, said method comprising:
    receiving user file backup selection of at least one file residing on local storage for backup;
    receiving a redundancy level selection for maintaining a specified number of copies of said file backup selection; and
    allocating a first portion of local write-accessible storage, such that said first portion size correlates to said file backup selection and said redundancy level selection.

10. The method according to claim 9, with the additional step of preventing a user from accessing said first portion of local storage.

11. The method according to claim 9, with the additional step of adjusting the allocation size of said first portion of local storage upon receiving a subsequent selection relating to file backup or redundancy level.

12. The method according to claim 9, with the additional step of receiving a request over a network regarding said first portion allocation size.

13. The method according to claim 12, with the additional step of receiving at least a portion of a file over a network for storage in said first portion of local storage.

14. A computer-implemented method comprising:
    receiving user selection, via at least one user-input device connected to a local computer, designating a first set of user-stored files residing on local storage for backup,
    wherein said first set excludes a second set of user-stored files residing on said local storage, and
    such that said selection does not comprise specification of the transfer destination of said first file;
    receiving user specification of at least one option associated with backing up said first set;
    reserving a portion of local storage as inaccessible to said user usage,
    wherein basing said portion size at least in part upon at least one user-selected option for said backup of said first set;
    locating over a network and selecting a first remote computer; and
    copying, as a first backup, at least a portion of said first set from said local storage to storage on said first remote computer.

15. The method according to claim 14, further comprising:
    receiving a user-specified redundancy level selection for maintaining a specified number of copies of said first set.

16. The method according to claim 14, such that selecting said first remote computer at least in part based upon indicia received at said local computer of at least one measured aspect of reliability of said first remote computer.

17. The method according to claim 14, further comprising:
    waiting a determined duration before commencing a second backup;
    locating over a network a currently-accessible second remote computer; and
    copying, as a second backup, a current set of user-selected files to said second remote computer,
    without deleting said first backup.

18. The method according to claim 14, with the additional step of including in said first set at least one file not selected by said user.

* * * * *